US006529722B1

(12) United States Patent
Heinrich et al.

(10) Patent No.: US 6,529,722 B1
(45) Date of Patent: Mar. 4, 2003

(54) SYSTEM AND METHOD FOR ENHANCED 9-1-1 ADDRESS DEVELOPMENT, MAINTENANCE AND CALL ROUTING USING ROAD ACCESS ZONES

(75) Inventors: Bruce Heinrich, East Burke, VT (US); Bruce Jason Heinrich, East Burke, VT (US)

(73) Assignee: Microdata, St. Johnsbury, VT (US)

( * ) Notice: Subject to any disclaimer, the term of this patent is extended or adjusted under 35 U.S.C. 154(b) by 0 days.

(21) Appl. No.: 09/336,443

(22) Filed: Jun. 18, 1999

Related U.S. Application Data

(60) Provisional application No. 60/089,857, filed on Jun. 19, 1998.

(51) Int. Cl.[7] ............................................. H04M 11/00
(52) U.S. Cl. ...................................... 455/404; 455/457
(58) Field of Search ................................. 455/404, 445, 455/456, 457; 379/45, 37; 342/450; 702/5

(56) References Cited

U.S. PATENT DOCUMENTS

| | | | |
|---|---|---|---|
| 5,235,630 A | 8/1993 | Moody et al. | 379/37 |
| 5,347,567 A | 9/1994 | Moody et al. | 379/45 |
| 5,347,568 A | 9/1994 | Moody et al. | 379/45 |
| 5,379,337 A | 1/1995 | Castillo et al. | 379/45 |
| 5,388,147 A | 2/1995 | Grimes | 379/59 |
| 5,479,482 A | 12/1995 | Grimes | 379/59 |
| 5,563,931 A | 10/1996 | Bishop et al. | 379/59 |
| 5,570,412 A | 10/1996 | LeBlanc | 379/58 |
| 5,596,625 A | 1/1997 | LeBlanc | 379/60 |
| 5,661,779 A | 8/1997 | Lee | 379/45 |
| 5,712,900 A | 1/1998 | Maupin et al. | 379/59 |
| 5,724,660 A | 3/1998 | Kauser et al. | 455/456 |
| 5,732,354 A | 3/1998 | MacDonald | 455/456 |
| 5,797,093 A | 8/1998 | Houde | 455/404 |
| 5,799,061 A | 8/1998 | Melcher et al. | 379/45 |
| 5,812,934 A | 9/1998 | Hard et al. | 455/31.2 |
| 5,815,810 A | 9/1998 | Gallant et al. | 455/433 |
| 5,873,040 A | 2/1999 | Dunn et al. | 455/456 |
| 5,889,474 A | 3/1999 | LaDue | 340/825.49 |
| 2001/0021646 A1 * | 9/2001 | Antonucci et al. | 455/404 |
| 2001/0028711 A1 * | 10/2001 | Antonucci et al. | 379/245 |

* cited by examiner

*Primary Examiner*—Nguyen T. Vo
(74) *Attorney, Agent, or Firm*—Downs Rachlin Martin PLLC

(57) ABSTRACT

System and method for enhanced 9-1-1 address development, maintenance and call routing using road access zones (RAZs). RAZs are geographic areas accessible by a particular road. RAZs are formed from geographic data in vector form which includes a plurality of road names, address numbers, and road center lines. The steps for forming the RAZ include: first assigning a number to each road name, then creating a roadname route system based on the plurality of road names and the address numbers, then creating a plurality of polygons, wherein each polygon is associated with a different road name number, and then overlaying the road center lines with the polygons so as to define a left side and a right side of each road center line. RAZs efficiently provide for the verification, maintenance and determination of road names, address parity, geo-coding and emergency service zones (ESZ). In addition, an emergency service zone data layer (ESZ) can be created from the RAZs, which allows for, among other things, an enhanced E-911 system suitable for use with wireless communication devices, such as cell phones.

15 Claims, 16 Drawing Sheets

SYSTEM AND METHOD FOR ENHANCED 9-1-1 ADDRESS DEVELOPMENT, MAINTENANCE AND CALL ROUTING USING ROAD ACCESS ZONES

This application claims priority from U.S. Provisional Patent Application Ser. No. 60/089,857, filed on Jun. 19, 1998.

FIELD OF THE INVENTION

The present invention generally relates to improvements in computer systems and application software for the development, validation and maintenance of addressing systems and the automated routing of emergency telephone calls from both fixed land sites and mobile wireless locations.

BACKGROUND OF THE INVENTION

The number 9-1-1 is a three digit telephone number that has been designated as the universal emergency number for public use to request emergency assistance. The code 9-1-1 was chosen because it is brief, easily remembered and can be dialed quickly. With reference to FIG. 1, basic 9-1-1 system 10, comprises a telephone 12, a telephone company (TelCo) central office 14 in telecommunication with the phone over a fixed wireline telephone network 16, and a public service answering point (PSAP) 18 in telecommunication with the central office. Depending on the area of service, typically a county or state, there may be one or more PSAPs. It is the function of PSAP 18 to transfer the call to the proper law enforcement, fire protection, emergency medical service or agency, etc. (collectively, "emergency service providers") responsible for responding to the emergency. In system 10, all 9-1-1 calls originating from telephone 12 are directed to a particular PSAP 18 through central office 14, depending on the exchange of the calling party number (CPN). In system 10, a call-taker (not shown) in PSAP 18 must determine the location and type of the emergency and transfer the call to the proper one of a plurality of emergency service providers ESP1, ESP2, . . . ESPn that should respond to the call.

An enhanced 9-1-1 (E-911) system has evolved from the Basic 9-1-1 system by providing an automated system for selectively routing 9-1-1 calls originating from telephone equipment at fixed address locations to the proper PSAP. With reference now to FIG. 2, E-911 system 30 comprises telephone 12 located at a fixed location, and central office 14 in telecommunication with telephone 12. The latter has an associated telephone number $TN_2$ and a calling party number CPN. System 30 further includes a regional 9-1-1 telephone switch 32 in telecommunication with central office 14, and a selective routing database (SRDB) 34 comprising a database of telephone numbers, wherein the SRDB and the switch are in electronic communication. Switch 32 is an automated switching device that searches a database of telephone numbers in SRDB 34 for a match with the particular CPN. System 30 determines the primary PSAP, i.e., the PSAP that should receive emergency calls from the address of the subscriber of the CPN from SRDB 34. PSAP 18 includes a 9-1-1 sub-system (not shown) for querying an external database, as described in greater detail below.

With continuing reference to FIG. 2, system 30 further includes a master street address guide (MSAG) 42, which is a listing of all streets and house numbers ranges within a 9-1-1 service area. The streets and address ranges are assigned selective routing codes, or emergency service numbers (ESNs), to enable proper routing of 9-1-1 calls. Thus, the MSAG is a summary database of valid address ranges, with the corresponding ESN for each range. The ESN is a unique number assigned to each combination of PSAP, law, fire and emergency service (EMS) provider and, in some areas, the community name or other delineated zone. System 30 further includes an automatic location identifier Data Base Management System (ALI/DBMS) 48 of CPN, subscriber name and address information and the law, fire and EMS emergency service providers for that location. ALI/DBMS 48 is in electronic communication with PSAP 18, MSAG 42 and SRDB 34. The emergency service providers ESPn have been automatically assigned from the address ranges in MSAG 42. In system 30, upon having the call routed to the appropriate PSAP, this PSAP (e.g., PSAP 18) queries ALI/DMBS 48 to determine the name and address of the CPN subscriber and predetermined emergency service providers ESPn. This information is then displayed on a call-takers screen.

Routing of calls from telephone 12 to primary PSAP 18 is accomplished by finding the address of the calling party, as obtained from TelCo records in MSAG 42. With continuing reference to FIG. 2 and system 30, a 9-1-1 call from telephone 12 at a specific street address location is received at TelCo central office 14 and is transferred to regional 9-1-1 switch 32. Switch 32 then searches a database of telephone numbers in SRDB 34 for a match with the CPN. SRDB 34 returns to switch 32 the telephone number TN of PSAP 18, i.e., the PSAP that should receive emergency calls from the address of the subscriber of the CPN. Switch 32 then uses this TN number to transfer the 9-1-1 call to the designated PSAP. The appropriate PSAP telephone number for each CPN has been pre-loaded into SRDB 34 by comparing the addresses of all TelCo subscribers with MSAG 42 and storing or updating SRDB 34 with the correct PSAP data. The database comparisons are performed on a daily basis within ALI/DMBS 48. Upon transfer to PSAP 18, the PSAP 9-1-1 sub-system queries ALI/DBMS 48 with the CPN and retrieves information (e.g., name, address, etc.) of emergency service providers ESPn that serve that address location.

Implementation of an E-911 system requires valid locatable addressing to perform properly. Many rural areas do not have city-style addressing and must change United States Postal Service (USPS) rural route and box numbers into valid locatable addresses. All areas, regardless of addressing status, must insure that every address is unique. That is, duplicate road names and/or addresses in the same municipality must be eliminated. If an area is to be re-addressed, the municipality must establish a standard distance between whole numbered addresses and establish one side of the road for odd numbers and one side for even numbers (parity). Based on these criteria, the measured distance of each site from the beginning of the road which it accesses determines the locatable distance-based address for that site.

There are two primary methods for establishing the distance to each address site: 1) field measurement using a linear measuring device such as a fifth wheel, and 2) Geographic System Information (GIS) methods to calculate the distance along a digital arc that represents the centerline of the road network to be addressed.

Field measurement involves proceeding to the beginning of each road to be addressed, setting the measurement device to zero and then recording the distance to each site, the side-of-road and, if available, the resident name/address information. Typically, the information is immediately entered into a computer database or written on paper forms and entered at a later time. The process requires manipulation and manual recording of vast amounts of information. Numerous errors are generally introduced in the measured distance, the side-of-road, and the existing address information. As a tabular database, visual inspection is the only means for review.

GIS calculation requires development of a road centerline (C/L) spatial database and capture of the coordinates of each building and/or access point. There are many GIS techniques for determining the distance along each road arc to a specified point along that arc. Typically, the distance is manually entered as an attribute for each address point, or a GIS procedure is used to measure and record the distance as an attribute without manual intervention. Assignment of side-of-road has been done manually. Capture of site coordinates utilizes rectified aerial photographs or with field operated global positioning systems (GPS).

Regardless of measurement technique, an essential part of any E-911 system is collecting current resident name and address data. This data is used to notify occupants of their E-911 address and must be stored as an attribute with the proper site point. Failure to accurately assign this data to the proper site would cause the wrong occupant to be notified of a newly assigned address.

For geographic areas that have addressing, manual inspection has been the methodology for insuring that sites have been properly addressed. Unfortunately, errors in parity and increment are extremely common. Geo-coding is the process of attributing each road segment between intersecting roads in a GIS road C/L data layer with the high and low address number for sites on each side of the road. This process is used for forming a required data layer for PSAPs having a map display. The data provides the basis for locating any address. However, manual entry of such information is prone to error. In addition, the updating of geo-coding is prone to error or, since automation of this task has not been fully realized, is often neglected.

GIS data development and address conversion must be validated with multiple, independent sources of tabular and spatial data. Quality assurance of captured data needs to be designed into the development plan. Unfortunately, it is not sufficient to make use of a plan that merely captures feature coordinates and a set of attributes without a plan for assuring its accuracy. Quality assurance by inspection is not a sufficiently reliable method of providing error-free data. Complete inspection requires quality control personnel to plot, inspect, and identify (if possible) errors to be reworked. Once reworked, it must again pass through quality control and be completely re-inspected (now 200% inspection) and passed or returned for additional rework and continued looping until all observed errors have been eliminated. This is time-consuming and will likely never ensure complete accuracy. Accordingly, this method is inadequate for E-911 data development.

Even after addresses have been developed and entered into the ALI/DBMS, this data, including the MSAG, must be properly maintained. Since the MSAG is a table of addresses having no spatial component, erroneous data is frequently entered without any type of spatial system to audit the validity of the data. Errors (discrepancies) are detected only at the time of an emergency call. These errors cause inappropriate routing and may add significant delay to the response of an emergency call. Errors include wrong address ranges, wrong ESNs, multiple entries of a street with different spellings, and inaccurate community names.

Database standards for 9-1-1 systems currently include a field for an x-y coordinate for each TN record in the ALI/DBMS. The plan has been to include the x-y coordinate stored in the ALI/DBMS with the other data downloaded to PSAP 18. A map display could use this location information to display the location of that TN on a map. These data fields have never been used as a result of the difficulty in properly maintaining this information. As telephone numbers are commonly transferred from one permanent address to another, it is not a good plan to store x-y coordinates in the ALI/DBMS with the TN. If a TN record misses being updated, an erroneous x-y coordinate would remain stored with the TN. As it is extremely difficult to find such errors, E-911 systems relying on this requirement would be unreliable and could prove hazardous.

The spatial nature of the MSAG is currently not considered during updating procedures. An MSAG is currently updated using traditional tabular techniques that are disassociated from GIS map data and geo-coding. Even when update of both tabular and GIS data is done, it is currently performed as two discrete and independent steps.

Wireless calls from cellular telephones and other radio-wave based devices, which have no fixed address, cannot be automatically routed using address-based E-911 system 30. When a wireless subscriber initiates an emergency telephone call, the billing address information, even if retrieved by the PSAP, is of no value in determining the present location of that mobile subscriber. Although there are various technologies currently being developed that will allow a wireless carrier to report the location (x-y coordinate) of the mobile subscriber to the PSAP, routing of coordinate-based 9-1-1 calls to the proper PSAP has yet to be accomplished. To provide the same level of service for a wireless call as is currently provided by wireline calls, this x-y coordinate needs to have automatic determination of the ESN for every location.

The Federal Communications Commission (FCC) has mandated that the cell and sector of the tower receiving a call from a cellular telephone be provided with the CPN for any PSAP ready to receive this information. In addition, the FCC has mandated that by 2001 wireless carriers shall have the capability of providing an x-y coordinate of the calling party within 125-meters of their location at least 67% of the time. Thus, the nature of 9-1-1 call routing needs to evolve from fixed telephone locations to fixed and mobile telephone locations. In addition to the simple address-based MSAG, a spatial database is necessary to route a coordinate based emergency call. Maintenance of permanent and mobile phone data, including mobile cell tower and sector locations, needs to be simplified to ensure a more reliable and safer E-911 system.

SUMMARY OF THE INVENTION

The present invention generally relates to improvements in computer systems and application software for the development, validation and maintenance of addressing systems and the automated routing of emergency telephone calls from both fixed land sites and mobile wireless locations.

Accordingly, it is an object of the present invention to provide a method for automating the development, quality control and maintenance of both the tabular and spatial databases. The system utilizes road access zones (RAZs) that describe the geographic area adjacent to each segment of each named road that accesses the geographic area.

Accordingly, a first aspect of the invention is a method of forming RAZs from geographic data in vector form which includes a plurality of road names, address numbers, and road center lines. The method comprises the steps of first, assigning a number to each road name, then creating a roadname route system based on the plurality of road names and the address numbers, then creating a plurality of polygons, wherein each polygon is associated with a different road name number, and then finally overlaying the road center lines with the polygons so as to define a left side and a right side of each road center line.

A second aspect of the invention is a method of creating an ESZ data layer having emergency service numbers, from a an MSAG using RAZs each having associated attributes including a road name, a road center line and an emergency service number. The method comprises the steps of first linking the RAZs to the MSAG through the road names, and then creating a plurality of emergency service zones by combining the RAZs that have the same emergency service number.

A third aspect of the invention is an enhanced 9-1-1 system for providing emergency communication between a telephone having an associated telephone number, a calling party number, and a location, and one or more associated emergency service providers. The system comprises a mobile telephone switching office in radio wave communication with the telephone, and a public service answering point in electronic communication with the mobile telephone switching office and the one or more associated emergency service providers. The system also includes a location determination unit in electronic communication with at least one of the mobile telephone switching office and the public service answering point, for providing the location of the telephone. Further included is a router switch in electronic communication with the public service answering point. The router switch contains router software for distributing calls to an available call-taker in the public service answering point. The system also includes an emergency service zone GIS data layer (ESZ) in electronic communication with the router switch. The ESZ coverage defines the geographic area of service for each unique combination of law, fire, and EMS emergency service agencies. The ESZ provides information to the public service answering point as to the emergency service agencies providing service to every location within the 9-1-1 service area.

DETAILED DESCRIPTION OF THE INVENTION

Figure 1:
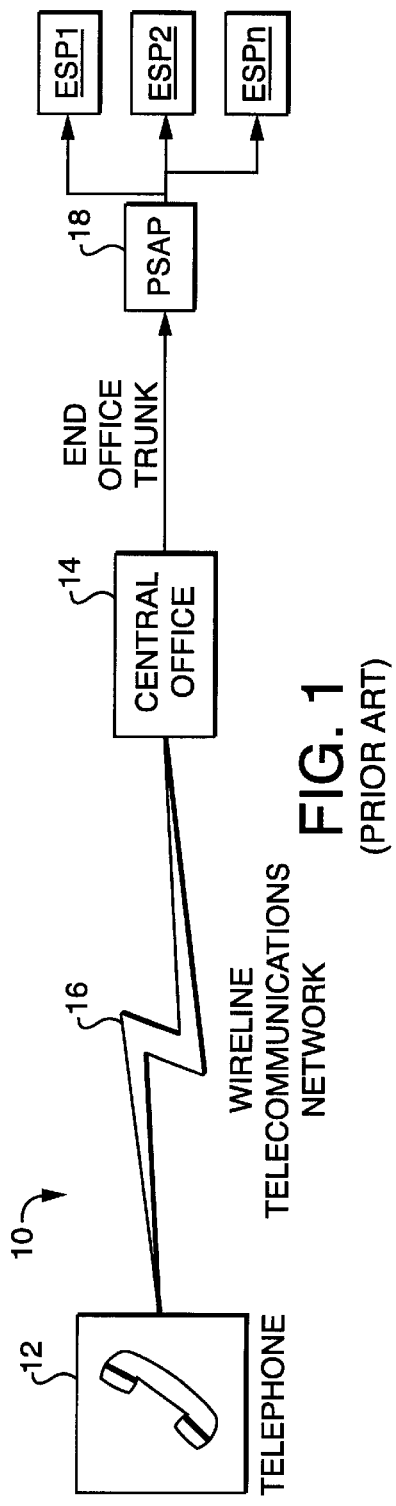
FIG. 1 is a schematic diagram of a prior art 9-1-1 system.

The present invention generally relates to improvements in computer systems and application software for the development, validation and maintenance of addressing systems and the automated routing of emergency telephone calls from both fixed land sites and mobile wireless locations.

A key aspect of the present invention is the use of road access zones (RAZs) that describe the geographic area adjacent each segment of road that accesses the geographic area. Development of RAZs is a graphic information system (GIS) process. Commercial GIS software application packages are available from various vendors that are capable of Euclidean raster operations and of RAZs is a graphic information system (GIS) process. Commercial GIS software application packages are available from various vendors that are capable of Euclidean raster operations and various vector operations as described herein that may be utilized in the present invention. A suitable GIS package that may be utilized in the practice of this invention is ARC/INFO™ from Environmental Systems Research Institute, Inc. of (ESRI). However, other conventional GIS computer programs that provides digital instructions for manipulating vector and raster based coordinate information and the associated attributes may also be used in connection with the present invention.

Following are definitions of basic GIS features that store spatial information (i.e., information about geographic location):

Data Layer or Coverage: A digital version of a map that provides a set of thematically associated spatial data considered as a unit. A coverage usually represents a single theme, or layer, such as roads, sites, soils, streams, or land use. Data layers are stored as a particular type of data such as point, line, polygon, region, node, or grid.

Points: points describe discrete locations of geographic features too small to be depicted as lines or areas, relative to the scale for which the features are intended to be printed. Buildings, fire hydrants, public telephones and other structures that require addressing would, generally, be much too small to see if printed to the scale of an E-911 road map.

Lines or arcs: lines or arcs represent the shapes of geographic objects too narrow to depict as areas. Roads and streams, for example, would be very thin or almost invisible if they were printed to scale on an E-911 road map and are therefore stored as line features.

Nodes: define the two endpoints of an arc, and may or may not connect two or more arcs. An arc is therefore a line segment between two nodes.

Feature Attribute Table: a tabular file containing used to store information for a specific feature class. Points, lines, polygons, and grids all have an attached table of information providing information about each geographic feature in the data layer. For example, each arc segment in a line coverage (data layer) has an entry in a feature attribute table.

Road center line (C/L): a line taken down the middle of a road. Road C/L data generally contains information or "attributes" describing the characteristics of the road, such as street name, route number, ownership, surface, etc. The spatial accuracy of Road C/L data is dependent on the source of the geographic data. Such sources may include existing data such as the U.S. Census Bureau's Topologically Integrated Geographic Encoding and Referencing (TIGER) road data, U.S. Geological Survey Digital Line Graph files (DLG), field collected (GPS) data and others.

ARCID: a field linking RAZ data layer to the road C/L data layer. As discussed further below, an important aspect of the present invention is the creation of RAZs. There are two spatial data models used in creating the RAZs: 1) the vector data model, and 2) the raster data model.

Points, lines and polygons are "vector" representations of geographic features. That is, each feature is described as one or a series of x-y coordinates (vertices) according to a specified topology. Points are represented by a single coordinate, lines by an ordered series of coordinates, and areas are recorded as a series of coordinates defining line segments that enclose an area. The enclosed area is referred to as a "polygon". In addition, the topology for the ARC/INFO™ vector GIS data has an arc-node data structure. The arc-node data structure stores and references data so that nodes construct arcs and arcs construct polygons.

Topology: topology is a precise spatial relationship between geographic features. In the arc-node data structure: 1) arcs connect to each other at nodes; 2) arcs connect to surround an area to define a polygon; and 3) arcs have direction and left and right sides.

Routes: routes define paths along an existing set of line features. The start point and end point of each named road is defined on a road C/L (line) data layer to create a RDNAME route system. This route system is measured according to mileage along the route for subsequent addressing of site points. The GIS program provides the capability of converting a defined route system into a line data layer where each route is converted into a single arc where the start node of the arc is the starting point of the route. Events describe occurrences of features located on a route. Each address site is an event on the RDNAME route system.

A raster data model is a regular grid of cells, or pixels, that contain a single value. It is a continuous surface. That is, all space within the model is covered. Because the raster data model is a regular grid, it is the preferred model for determining an ordered analysis of the distance of each cell from other cells. Many of the global functions need access to all the cells in the input grid(s) to complete the computations necessary to achieve the desired results. Global functions are divided into several categories: Euclidean distance, weighted distance, other, surface, hydrologic, groundwater and multivariate. Euclidean distance is calculated from the center of the source cell to the center of each of the surrounding cells. True Euclidean distance is calculated in each of the distance functions. Conceptually, the Euclidean algorithm works as follows: for each cell, the distance to each source cell is determined by calculating the hypotenuse with the "x max" and "y max" as the other two legs of the triangle. This calculation derives the true Euclidean distance, rather than the cell distance. The shortest distance to a source is determined, and if it is less than the specified maximum distance, the value is assigned to the cell.

Creating the RAZs

Figure 3:
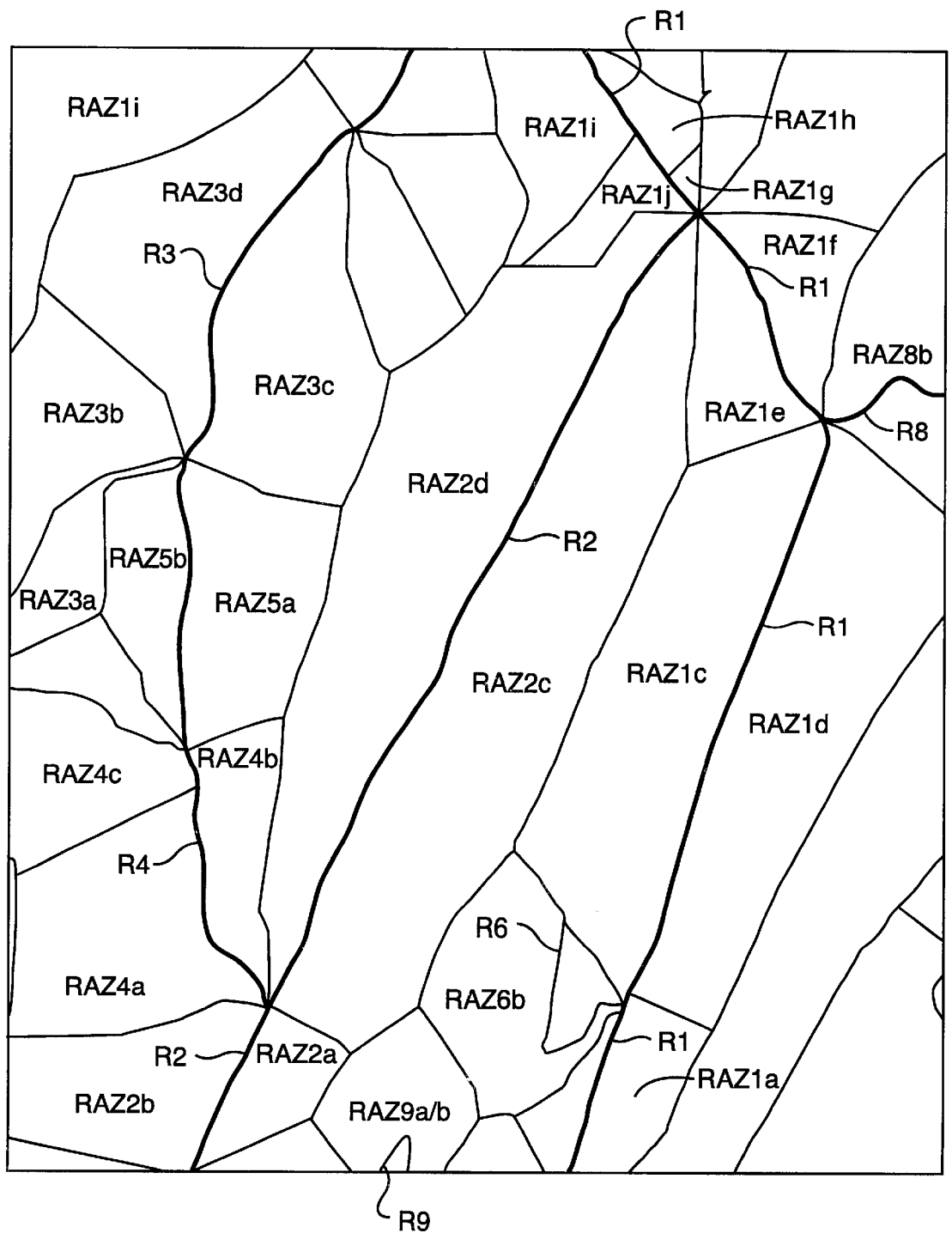
FIG. 3 is a sample map depicting RAZs for a small geographic area.

The present invention utilizes polygonal RAZs that describe the geographic area adjacent each segment of each road. As the name implies, these are the zones or regions accessible from the associated road segment. FIG. 3, shows a plurality of RAZs (RAZ1a–j, RAZ2a–d, . . . ) for a small sample area. As described below, the RAZs are stored as a GIS polygon coverage (i.e., a spatial data layer) of road access areas served by each named road R (R1, R2, . . . Rn). Both a raster and a vector model is used to efficiently create the RAZs, as discussed below.

Figure 4:
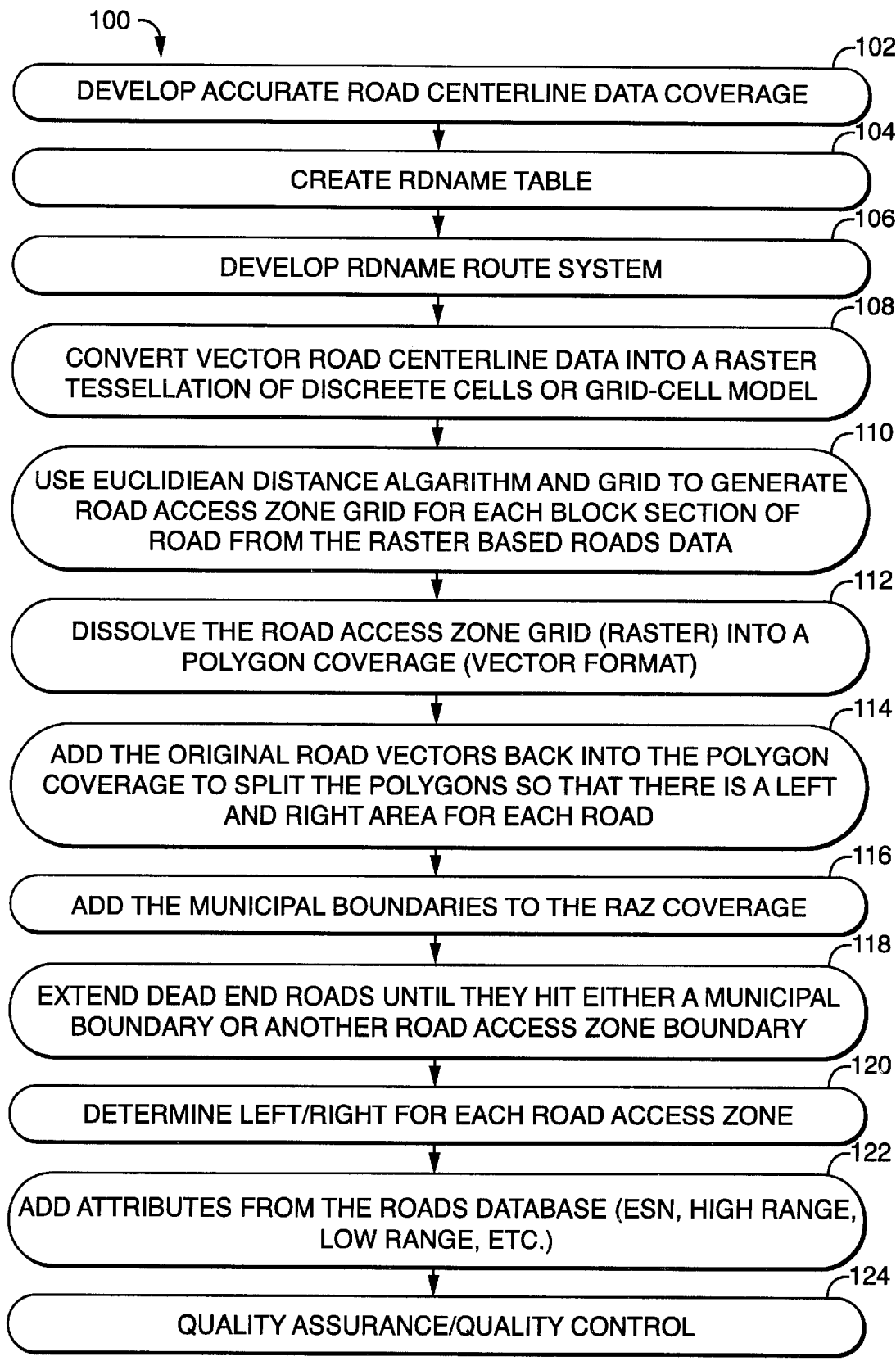
FIG. 4 is a flow diagram of the steps for creating RAZs.
Figure 5:
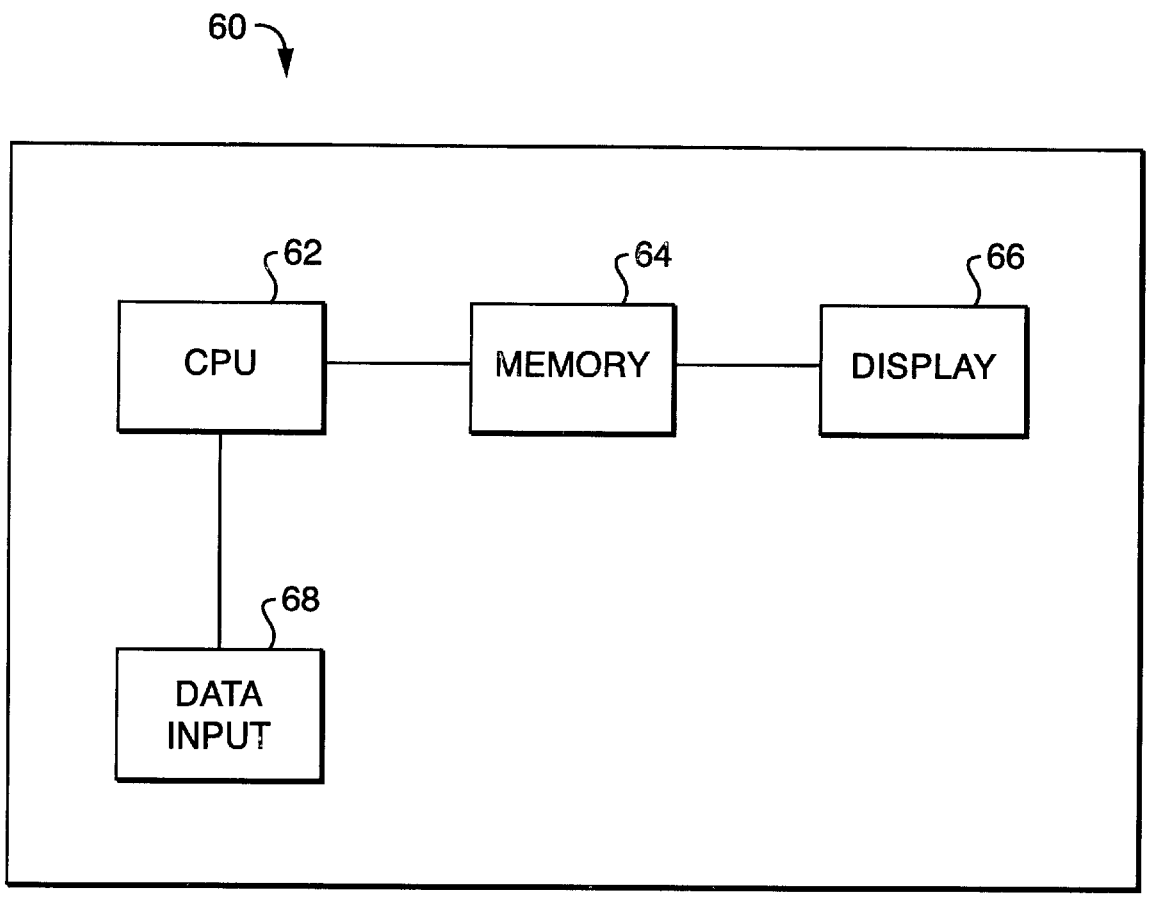
FIG. 5 is a schematic diagram of a digital computer suitable for implementing the method according to the present invention.

With reference to FIGS. 4 and 5, the method of the present invention is preferably implemented as a software program that is executed by a conventional digital computer 60 having a central processor unit 62, short-term and long-term memory 64, a display 66 and data input means 68 such as a keyboard or disc drive. A suitable computer 60 is made by Gateway of North Sioux City, S. Dak., is identified by model number GP6-450, and contains a 450 MHz microprocessor and 128 MB of RAM. Steps 102–124 in flow diagram 100 describe the method of creating RAZs according to the present invention.

Figure 6:
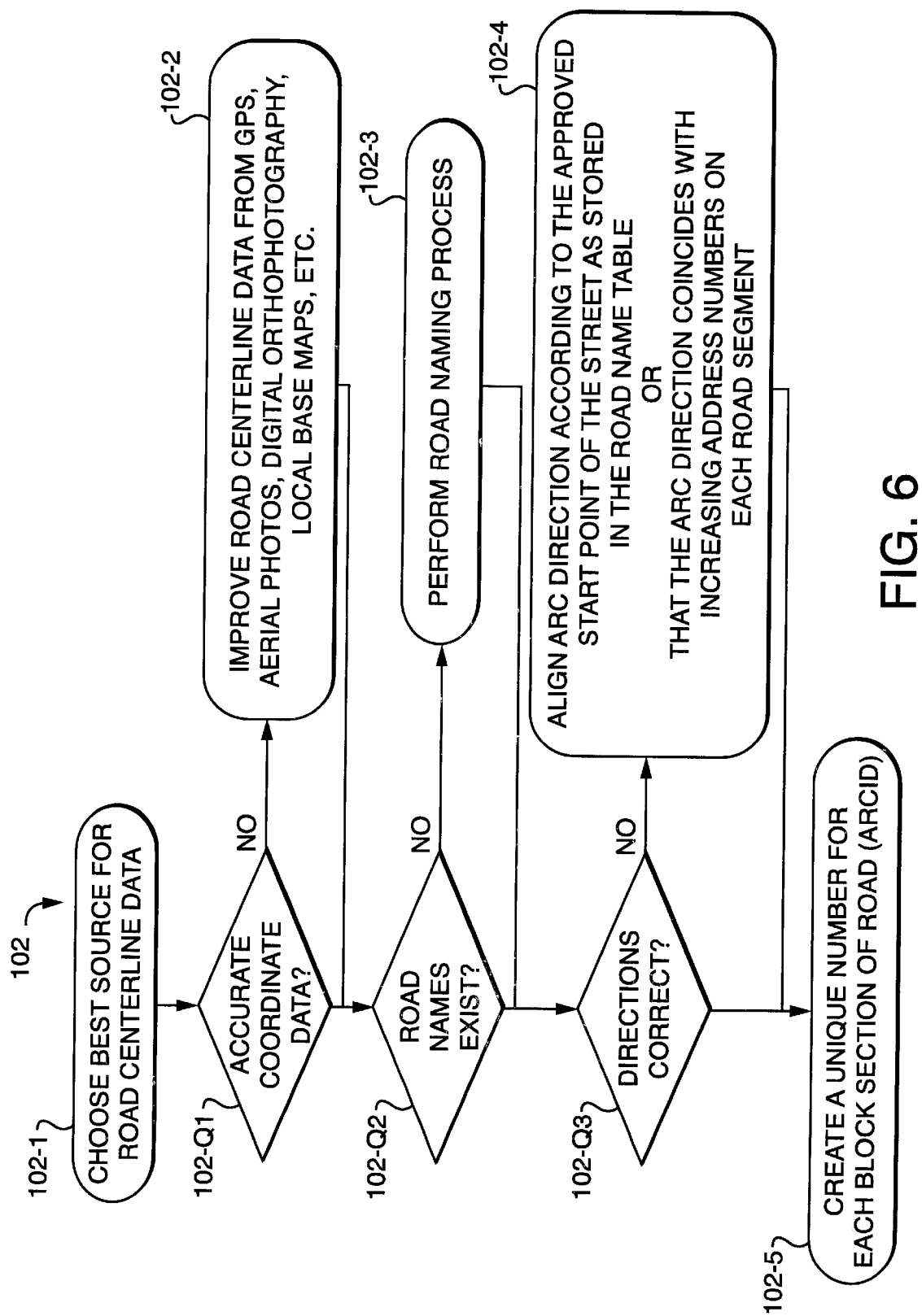
FIG. 6 is a flow diagram of the steps associated with step 102 of the flow diagram of FIG. 4.

The RAZs of the present invention are derived from road C/L data. Accordingly, in the first step 102, accurate road C/L data coverage is obtained. This geographic data includes at least the centerline of a particular road system and the name of each road. With reference now to FIG. 6, the development process begins in step 102-1 by choosing the best available source for road C/L data. As previously mentioned, typical sources include TIGER, DLG, and locally developed data. Then, a first query 102-Q1 is made as to whether the road C/L data source so chosen has accurate coordinate data. Although the invention can utilize inaccurate data, if the data is not accurate, then the method proceeds to step 102-2, in which the road C/L data is improved to make it more accurate. The improvements are made based on GPS data, aerial photographs, digital orthophotography, local base maps, and the like. If the road C/L data has accurate coordinate data, or once it has been made more accurate via step 102-2, a second query 102-Q2 is made as to whether the road names exist. If not, then the method proceeds to step 102-3 in which the process of road naming is performed as outlined in step 104, discussed below and outlined in FIG. 7. If the road C/L data has road names, or once road names are obtained via step 102-3, then a third query 102-Q3 is made as to whether the directions depicted by the road sections are correct. If not, then the method proceeds to step 102-4, which involves aligning the street directions such that they match the direction of increasing address numbers on each road. If the directions are correct, or once the directions are corrected, then the final step 102-5 involves creating a unique number for each block section of road.

Figure 7:
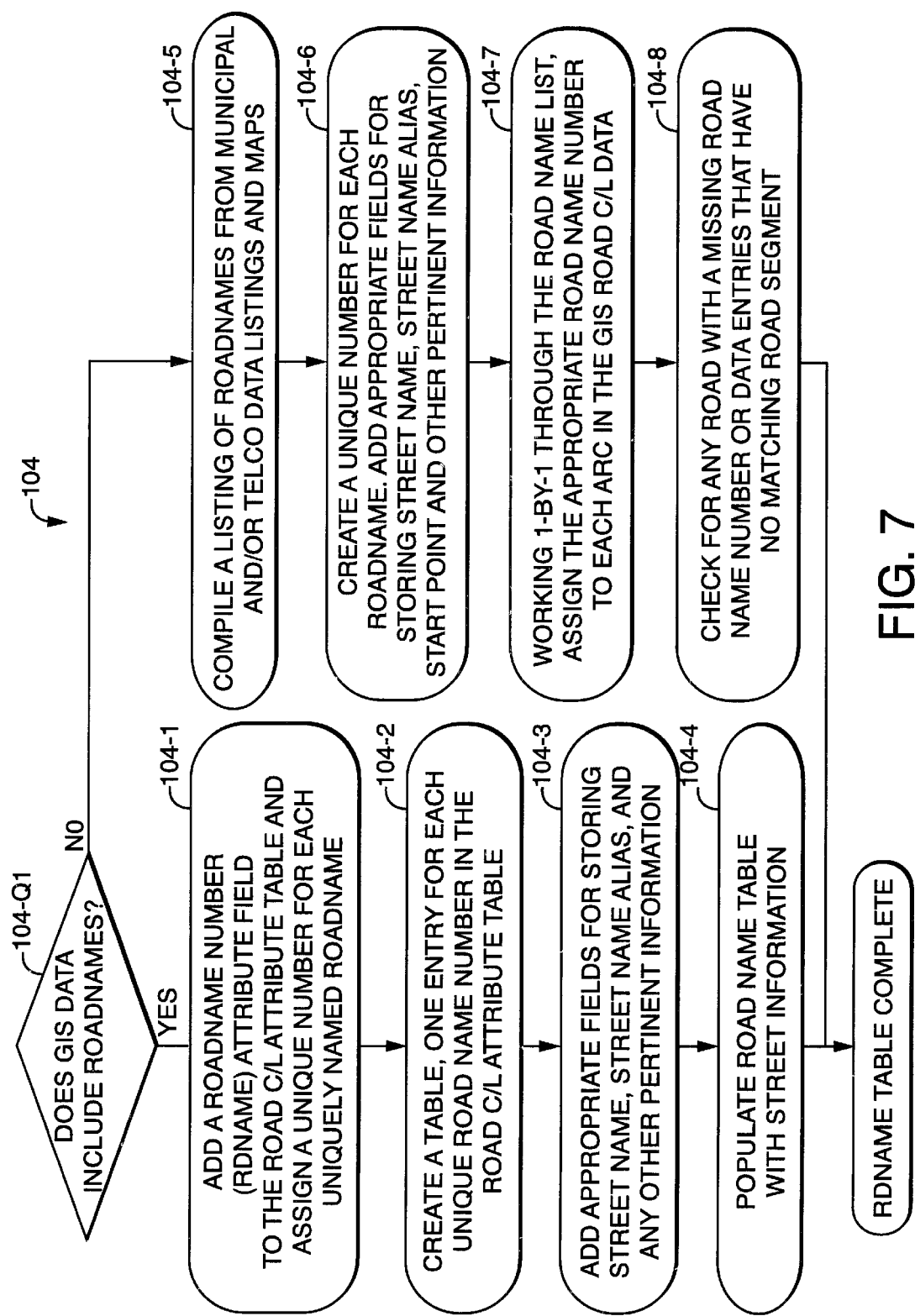
FIG. 7 is a flow diagram of the steps associated with step 104 of the flow diagram of FIG. 4.

With reference again to FIG. 4, in the next step 104, a database of road names RDNAME is created that assigns a unique number to each road name. With reference now also to FIG. 7, the RDNAME data base is created through four steps depending on the existence of road names in the GIS road C/L data layer. If road names are present, (query step 104-Q1) the first step 104-1 is to assign a unique number for each uniquely named road in the road C/L attribute table. A unique listing of road names is obtained using a command in the GIS program that summarizes a database table by any field in the table, e.g., the FREQUENCY command of the ARC/INFO™ program. In this case, such command is used to summarize the road attribute table by the fully spelled road name. Thus, in step 104-2, a road name table is created, with one entry for each unique road name spelling for which a unique number is assigned. Next, in step 104-3, appropriate fields are added to the road name table created in step 104-2, for storing street name, street name alias, and other pertinent street information. Then, in the final step 104-4, the road name table is populated with this street information. If query step 104-Q1 indicates road names are not present, then in step 104-5, it is necessary to compile this information from municipal, TelCo and other map sources. Next, in step 104-6, a unique number is assigned to each road name and fields are added to store other pertinent data regarding the road name such as other aliases and the starting position. Next, in step 104-7, the numbers are assigned to the arc sections of the road C/L attribute file that have that name. The final step, 104-8, is to insure that all roads are named and that all road names have been used.

Once the road C/Ls have been established per above, a measured road name route system is constructed using a command in the GIS program that measures the length of the roads in the road name route system, e.g., the MEASUREROUTE command of the ARC/INFO™ program. The road name route system defines the characteristics of the road system in the municipality according to the road naming and addressing. Route direction is determined from the direction, or desired direction, of increasing address numbers on each road. The route system is used to orient each road segment in the road CL data layer in the direction of increasing address numbers. The RAZ coverage is then built from the road C/L data. The route system ensures that the starting point and direction for each road is consistent. Each arc (road segment) in the road C/L coverage is attributed with a number that represents the unique road name spelling in the road name table. The road name route system is then transferred into a new, separate road C/L coverage, where one arc represents each named road (represented by its road name number).

Accordingly, with reference again to FIG. 4, a road name route system is developed in step 106, based on the direction of the streets and the unique road name number using the RDNAME table created in step 104. However, the resulting route system may not have the proper start point. Thus, it is necessary to review each route in the system to insure that each has a correct start point in accordance with the municipality. This will require reversing the direction (flipping) of any route found to be incorrect. Routes are made up of sections that correlate to individual arcs in the road C/L data layer. These sections have associated attributes F-MEAS and a T-MEAS "from" and "to" measure from the beginning of the road, respectively, that are used to determine if the arc is oriented in the same direction as the section and route. By proceeding through the section table a section at a time (cursoring), each arc is flipped to coincide with the direction of its associated section in the road name route system. Upon completion of this step, all named road arcs are pointing in a direction corresponding to their increasing addresses or the start point as indicated in the road name table.

Figure 8:
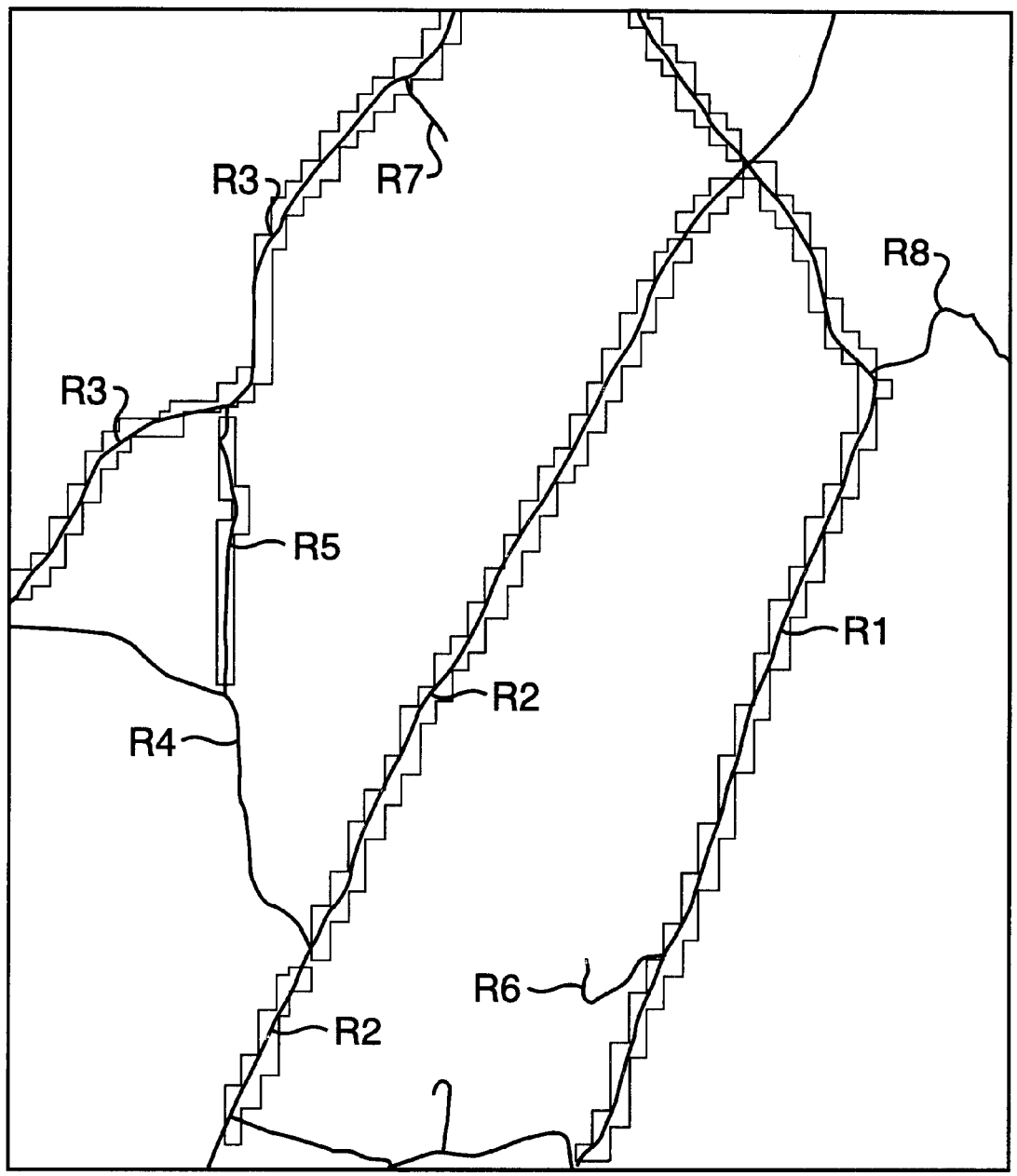
FIG. 8 is a sample map depicting the conversion of vector arcs to grid cells.

With reference again to FIG. 4 and also to FIG. 8, the initial procedure, described below, for building the RAZs uses a procedure in the GIS program for converting vector road arcs R1, R2, . . . Rn into a raster tessellation of discrete cells (a grid), e.g., the LINEGRID command of the ARC/INFO™ program. Vector data representing the named roads are converted into a grid-cell model, where each cell is attributed with the road name number of the road arc which it overlays. Areas that have no overlaying road arc are attributed with NO DATA. The grid cell is set sufficiently small (usually 2 meters) such that the deviation between the polygon node for a road intersection and the actual road arc intersections is less than the addressing increment on one side of a road. FIG. 8 displays road C/L vector arcs overlaid on an exaggerated grid model. Wherever a cell is overlaid with an arc, the cell is attributed with the road name number value of that arc. Where more than one arc overlays the same cell, the arc with the longest contact is used for attributing the grid cell. Cells that have no overlay are not shown in the FIG. 8 and are attributed with a NO DATA value. Subsequently, the NO DATA cells are attributed with the road name number of the closest populated source cell using a Euclideon distance algorithm in the GIS program, as described above, such as the GRID function EUCALLOCATION of the ARC/INFO™ program. The resulting grid is then converted back to a vector polygon data layer comprising a plurality of polygons, a command, which attributes each polygon with the road name number of the named street overlaying it. An exemplary command is GRIDPOLY of the ARC/INFO™. The arcs separating the polygons are all coded with a road name number of zero for subsequent identification of those polygon boundaries that are not a road C/L arc.

Figure 9:
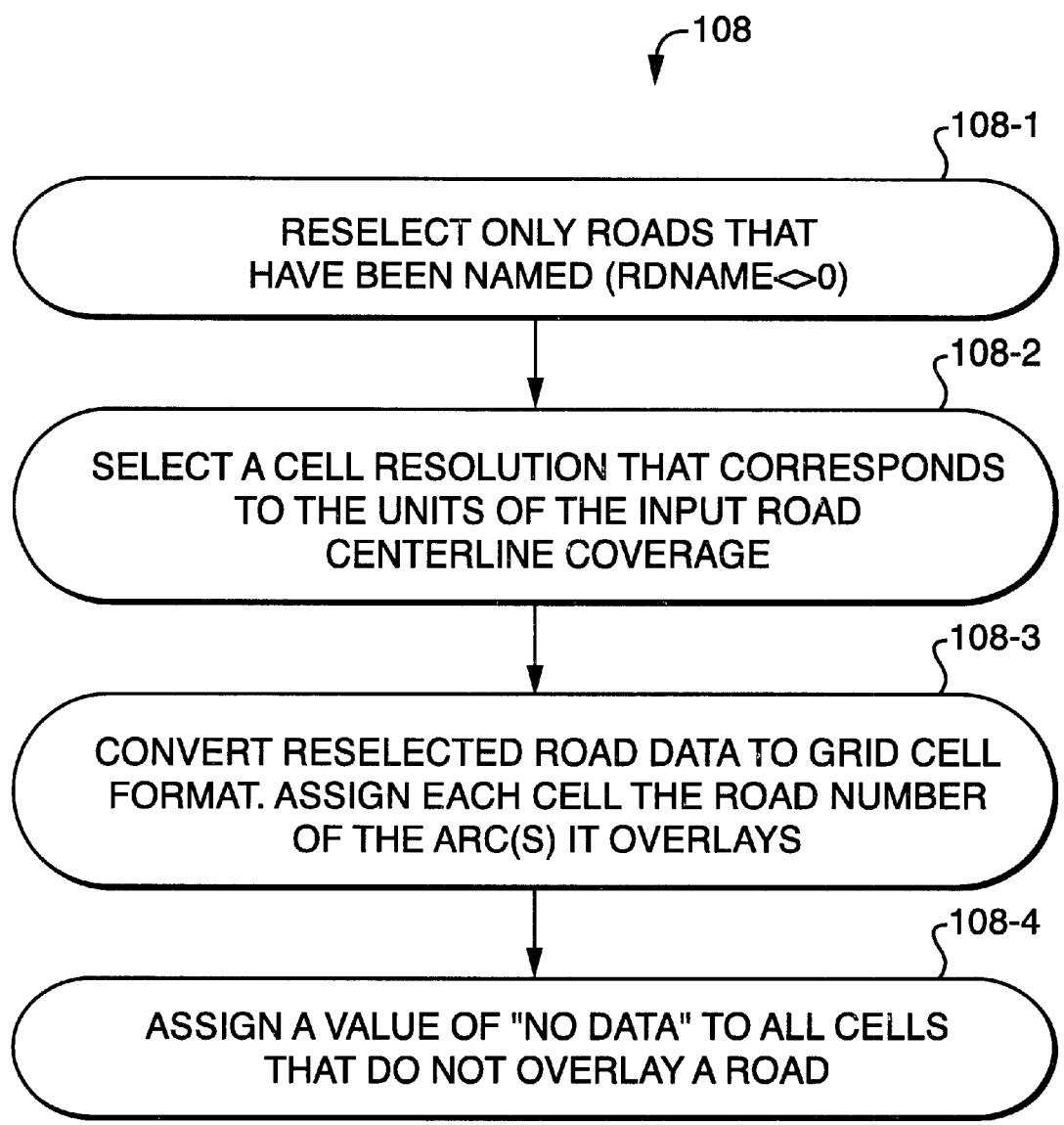
FIG. 9 is a flow diagram of the steps associated with step 108 of the flow diagram of FIG. 4.

Accordingly, with reference again to FIG. 4, in step 108, the road C/L data layer, which is a vector arc data layer, is converted into a raster tessellation of discrete cells (i.e., a grid of cells). This allows for the processing of the vector road C/L data layer using a grid-cell model. With reference also to FIG. 9, in step 108-1, roads in the road C/L data layer that have a non-zero road name value (i.e., RDNAME < >0) are selected (or "re-selected"). Next, in step 108-2, a cell resolution is chosen that corresponds to the units of the input road C/L coverage. Next, in step 108-3, the re-selected road data of step 108-1 is converted to a grid cell format (i.e., a RAZ grid), which is generated from the RDNAME data layer using a Euclidean distance algorithm. The road C/L data layer is thus converted to a raster (or grid) based data layer, where each cell value is equal to the road name number of the arc passing over that cell location. Next, in step 108-4, all other cells are given the optional value of NODATA.

By gridding the vector data as described above, a rectangular shaped grid of cells is created that will cover all roads in the system. The cell size must be chosen to be small enough such that, at a minimum, all roads are represented in the raster layer with a left and right hand cell. A two-meter cell size has been found to be reliable, even in dense areas with short roads.

The raster grid now contains cells that have a value equivalent with the road name number of the arc that it would overlay. Cells without an overlaying road have the NODATA attribute.

With reference again to FIG. 4, in step 110 for creating the RAZs, a derivative grid is created using a Euclideon distance function which assigns to the cell a cell value of the road name number of the closest source cell. The source cells are all the non-NODATA values and all the Euclidean distance functions are calculated from source cells to non-source cells. Thus, the derived grid contains a continuous grid representing the nearest named road to each cell in the grid. This is the raster version of the RAZs.

In the next step 112, the raster RAZ grid is dissolved into a temporary polygon vector coverage in the vector TMPRDPOLY using a command in the GIS program which identifies cells having the same RDNAME value and combines them to create vectorized polygonal areas representing the RAZ for each road. Such a command is GRIDPOLY of the ARC/INFO™ program, described above. The derived polygon coverage includes one polygon for both sides of each named road.

Figure 10:
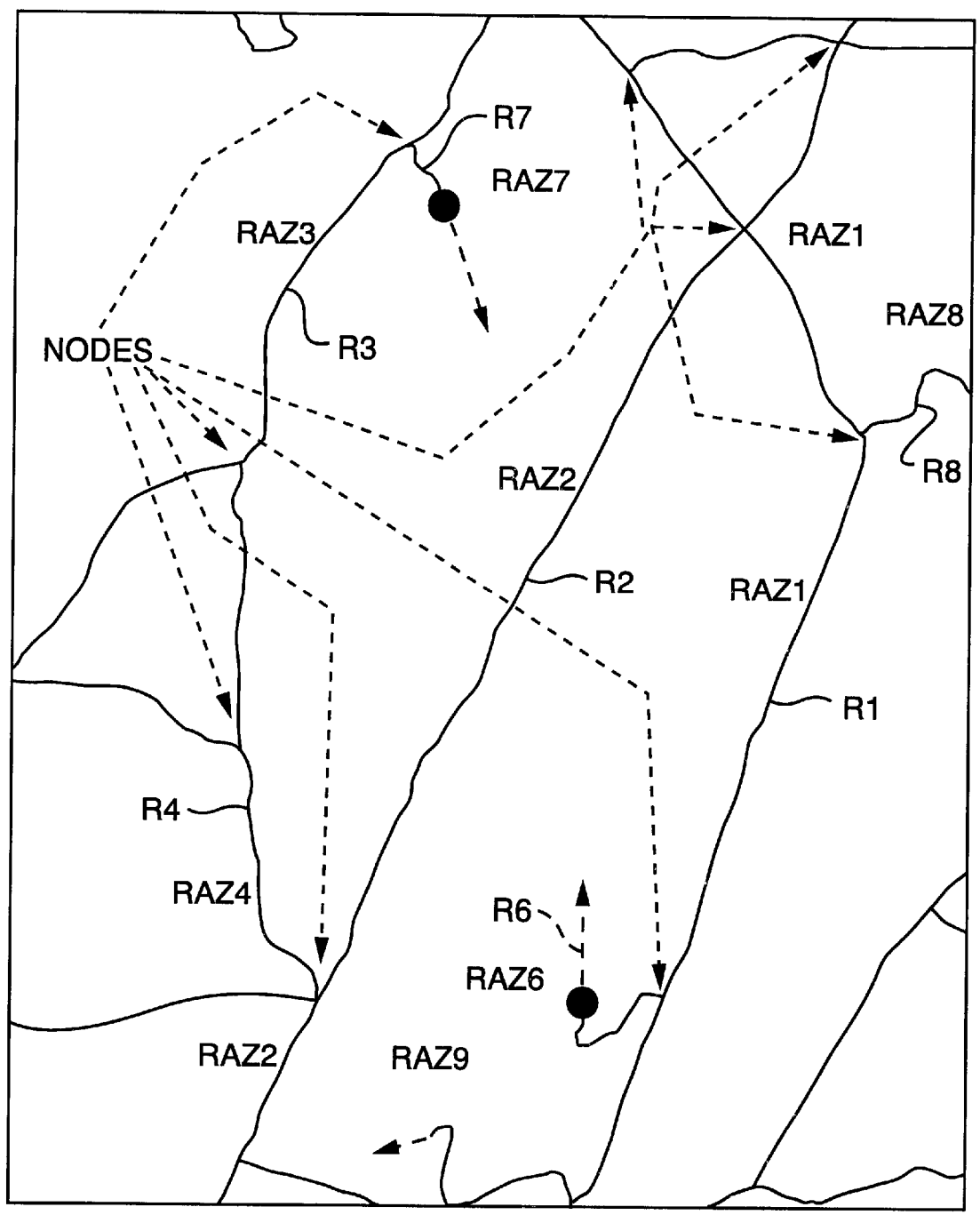
FIG. 10 is a sample map depicting polygons of areas closest to each road centerline.
Figure 11:
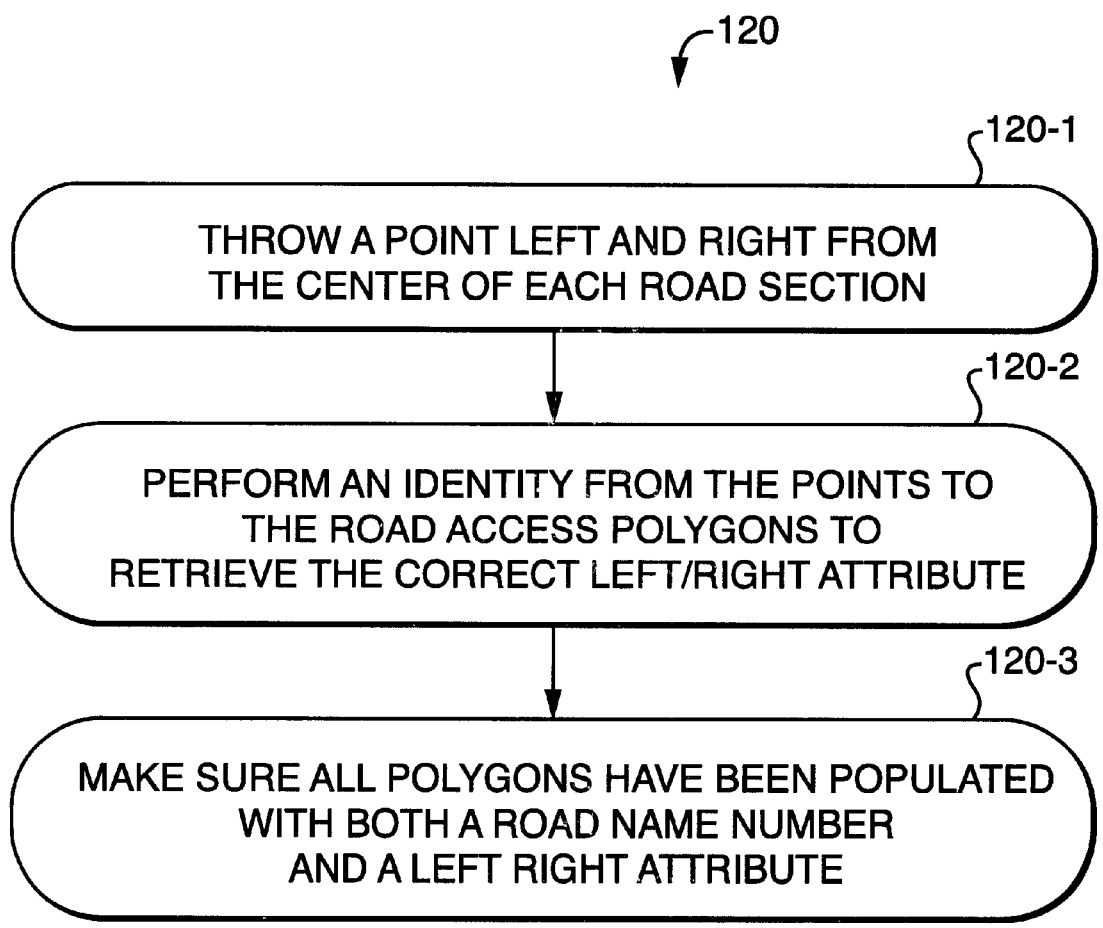
FIG. 11 is a flow diagram of the steps associated with step 120 of the flow diagram of FIG. 4.

With reference now to FIG. 10, development of the RAZ polygon layer is completed by adding the original road arcs R1, R2 . . . Rn to polygons RAZ1, RAZ2 . . . RAZn using arcs that are oriented in the direction of increasing address numbers. The arcs are added by creating a temporary data layer of road centerlines and municipal boundaries that have been combined into a single polygon data layer. The RAZ polygon layer is then combined with the road/municipal boundary layer. This may be accomplished using the ARC/INFO™ IDENTITY operation. All dead-end roads are then extended using a command in the GIS program which extends the dead-end roads until they reach another road polygon or the municipal boundary. The nodes of the road access zone polygon data layer are made to coincide with any nodes in the road C/L coverage. This may be accomplished using the GIS program with the commands (e.g., NODESNAP and MATCHNODE of the ARC/INFO™ program) which respectively move and match the nodes. Topology is then built for the polygon coverage. Since the roads are added in the same direction as addressing, the left and right polygons associated with each road arc will be the side-of-road that corresponds with the addressing. By relating the road C/L attribute table to the polygon attribute table that is established when topology is built, the road name number and side-of-road data are added as attributes to the road access polygon data layer. Roads that are closer than the grid-cell size or that were created with small overlaps of other roads may cause polygons on the opposite sides of a road segment to be different (they should be the same). All such occurrences are automatically flagged for review so that only the appropriate polygon is left upon inspection.

Upon completion of the above process, polygons that border more than one road segment are identified. These road polygons are then split to insure each road does not share a polygon with any other road segment. That is, each time a road intersects another road from only one side, the opposite side will have only one polygon for the road sections on either side of the intersection. This polygon must be split. This is the initial road access polygon layer. During the addressing and mapping development process, the polygon boundaries may be adjusted to allow these geographic regions to properly overlay the buildings that are accessed from each named road.

Accordingly, with reference again to FIG. 4, in next step 114, the road arcs R1, R2, . . . Rn from the road C/L data are added back (overlaid) into the road access polygon layer to split the polygons into left and right sides of each road R1, R2, . . . Rn. As the resulting vector data layer is derived from square grid cells, the edges of each polygon are not smooth, but are actually stair-steps. To remove the unnecessary vertices causing this feature, the new coverage is generalized with a weed tolerance 1.5 times the size of the cell. For a grid-cell size of 2-meters, the weed tolerance should be 3-meters. This will remove as many vertices as possible without undue distortion of the polygons.

With reference again to FIG. 4, in the next step 116, the municipal boundaries are added to the RAZ polygonal coverage, as mentioned above. This is accomplished using a command in the GIS program that merges the municipal boundary coverage with the road C/L coverage to create a polygon data layer RDSTB. An exemplary command is the FREQUENCY command of the ARC/INFO™ program. At this point, each of the essential spatial layers have been merged together to create the substructure for the RAZ. The road arcs are extended by a small amount (15-meters) to insure they intersect with the town boundary. Internal dead-end roads are not extended until joined with the road polygon coverage. The arc-ID of each arc is adjusted so that it is unique. The result is a collection of RAZ polygons having an outside boundary where the municipal boundaries occur.

Polygon topology is then created for coverage data layer RDSTB. All features in the road polygon layer that are overlaid by the road/town boundary data layer RDSTB are joined using a command in the GIS program to create RDSLR, the preliminary RAZ data layer. Topology for the resulting coverage, RDSLR, is then created for the polygons to allow attributing and node matching. An exemplary command is the IDENTITY command of the ARC/INFO™ program.

A temporary coverage of points is created from each node in the road C/L data layer and stored as a separate point data layer, RDNODES. The nodes in the preliminary RAZ data layer, RDSLR, are then moved ("snapped") to match the points in this temporary coverage using a GIS program node matching algorithms, such as MATCHNODE in the ARC/INFO™ program. The node-matching algorithms will move any node within a specified distance of the underlying point data layer to be precisely on top of that point. The tolerance should be set to two times the cell size (4-meters) to have the RDSLR polygon intersections closely match the actual road intersections.

In the next step 118, the dead-end roads in RDSLR are extended as far as needed to intersect with the municipality boundary, or a road access polygon boundary using a GIS program command, such as the EXTEND command of the ARC/INFO™ program. In other GIS packages, similar operations may be available, or, as in the case of ArcView™, routines may be constructed using the coordinate values of the end vertices to perform the extension. The direction of extension of each dead-end road is determined by extrapolation using the last two vertices in the road. Upon re-establishing topology, RDSLR polygons are attributed with the road name number of the road from which it was created by transferring a "GRID-CODE" value to the polygon attribute field of RDNAME. The GRID-CODE value is the attribute field in the RDSLR polygon attribute table that was originally derived from the raster model of the road C/L data layer. The GIS program is used to create a field named GRID-CODE that is populated with the desired source field (RDNAME). An exemplary command for achieving this operation is the LINEGRID command in the ARC/INFO™ program. In this step, the RDNAME field, created during the identity process, is made to have the value of the GRID-CODE.

The RDSLR boundary arcs are then attributed with the road name number in RDSTB by establishing a relation based on their unique IDs, previously established.

In the present invention, it is necessary to establish the left/right relationship of each road access polygon. Accordingly, with continuing reference to FIG. 4, in the next step 120, a relation is established between a polygon attribute table (PAT) and an arc attribute table (AAT) based on the left polygon number in the arc table with the record number of the polygon attribute table. Selecting only those records where the left polygon of a road arc equals the polygon record number and the arc road name number equals the polygon RDNAME (previously, GRID-CODE) establishes those polygons that are on the left side of the road segment. The left/right attribute (LR) of these polygons is made to equal L. All other unassigned polygons attributes are made to equal R.

With reference now to FIG. 9, a preferred method for determining the left/right relationship of each RAZ involves the following steps. In the first step 120-1, a point is selected ("thrown") on either side of each road section in the RAZ (see FIG. 8). Next, in step 120-2, an identity from the points to the RAZ is performed to retrieve the correct left/right attribute.

Finally, in step 120-3, the RAZs are all checked to ensure they have been populated with both a road name number and a left/right attribute.

The process of gridding the RAZs can introduce small polygons on the opposite side of intersecting roads that need to be removed. These polygons are found by checking for road arcs where the left-polygon has a different road name number from the right-polygon. These are flagged and subsequently reviewed and corrected.

The above-described RAZ creation method establishes a new, independent data layer that correlates the road name and side-of-road information to all areas of a municipality for any named road system. In a preferred embodiment of the present invention, the application of RAZs is substantially extended by adding a step 122 (FIG. 4) which relates the RAZ to the road name table RDNAME based on the road name number, and adding the polygon field attributes to the RAZs, such as the ZIP code (ZIP) of the post office providing delivery service, and the telephone exchange (NNX) for the TelCo providing land-line telephone service to each road area.

The ZIP and NNX provide a narrowed set of site possibilities when matching the data layer of site points to the tabular file of postal delivery records and TelCo customer service records. GIS is utilized with this information to quickly provide the subset of records available on any named road within any community or such criteria. By limiting a set of sites to only those on a particular road and then allowing sorts on name and other site attribute information, the required time for matching TN and postal records to an addressed site point is substantially reduced.

Also, high and low addresses for sites in the zone may be added as well. The initial values for this attribute are established by overlaying the road access polygons with the address site point layer and passing the unique-ID of each polygon to all sites. Sorting the site attribute table by RAZ-ID and the address of each site, these high-low values can be determined and populated into the RAZ polygon layer. Since each RAZ polygon is related to a unique road arc, the high-low address on the left and right side of each road can be automatically determined and populated into the road attribute table.

Upon completion of creating the RAZs, the road access polygons are re-processed to ensure proper GIS topology has been ascertained. The arcs are attributed with the road name number of the road if it was derived from a road arc. Otherwise the arcs separating each road access zone is attributed with a value of zero. The polygons have an attribute field for storing the adjacent road name number of the associated road C/L arc named RDNAME that has a value equal to the road name number of the nearest road and a field LR equal to the left or right side of the road it borders. Since the arc-node topology was created to be equivalent with the direction of addressing, the left-right relationship also applies to addressing on that road.

With referencing FIG. 4, the final step 124 is to compare the coverage area of each RAZ polygon with previously collected site point data, if such exists. Site point data is collected in the field using GPS technologies and from previously mapped sources. Site points are attributed with the same road name number as developed for the road C/L data layer. Although the sites have been reviewed during GIS processing, field personnel may find an improperly mapped site that requires re-positioning. This quality control step insures that the area covered by each RAZ polygon contains only sites with the same road name number. It is important to make final adjustments to RAZ boundaries to insure that all site points accessed from a particular road segment have an appropriately attributed RAZ polygon that overlays it. In addition, sites such as fire hydrants that were mapped very close to a road may require repositioning in order to align properly with the RAZ left/right designation.

Improving Field Data Collection Accuracy

This technology has been directly incorporated into field collection of site addressing information. By creating RAZs prior to field collection from the road name system to be used for navigation, the RAZs can be immediately used to improve field data collection accuracy. Typical GIS functionality provides for determining which RAZ polygon a newly placed site falls within. During field data collection, technicians enter the location of one or more sites that requires addressing into a vehicle mounted GIS. This is a first set of sites. Data Entry is accomplished using various methods of input including GPS and manual digitizing on a computer screen. The site points that are added also require entry of various site information including the name of the road from which the site is accessed. This is critical information for subsequent addressing operations. The RAZ polygons used by the GIS have a second set of sites comparable to the first set of sites. Comparing the first set of sites to the second set of sites quickly confirms that the road name number of the road access polygon that overlays the site point added is the same as the road name number entered by the technician for that site. By providing a warning if the numbers are different the field technician is required to either correct the situation or explain the circumstance that might exist to allow the condition. This procedure eliminates all road name data collection errors.

In addition to eliminating road name errors during data collection, RAZ polygons are used during verification of site data to insure that sites that are moved or added also obtain an appropriately attributed road name number.

Ascertaining Addressing Parity

The RAZs are used in the addressing process to establish the proper parity of each site address or to audit that the proper parity has been assigned to an address by performing a GIS process of overlaying a set of points with a polygon coverage and passing the polygon attributes to the point attribute table. The left-right road relationship can be passed to each site accessed from each road using a command in the GIS program, such as the IDENTITY command of the ARC/INFO™ program. For new addressing applications, the distance to each site or driveway access point can be automatically determined from the start of its respective road. Depending on the standard increment established by the municipality, this distance is converted into a whole numbered raw address. The raw address is converted to an address with the proper parity by adding one to all sites that have a raw address that is evenly divisible by two (2) and has a left-right (LR) attribute of for the odd side of the road.

Likewise the raw address is converted to an address with the proper parity by adding one to all sites that have a raw address that is not evenly divisible by two (2) and has a left-right (LR) attribute of for the even side of the road.

The above-described method of the present invention provides allows for automated addressing of sites with property parity in an entire municipality. Using a similar process during maintenance of addresses (adding new addresses), the polygons established herein will insure that all addresses assigned will have the correct name and parity. The same tests may be executed each time an address is added, changed or moved.

For existing address applications, the left-right attribute is used in a road-by-road technique to test that all sites within each access zone have the same parity. An assessment report is generated describing each site with an erroneous parity.

Assignment of Emergency Service Providers (ESPs) to RAZ Polygons

RAZ polygons are utilized to insure that each addressed site has an appropriate street name and an address parity consistent with the left or right hand side of the road. During GIS processing of the site data, each site address is compared with the RAZ polygon values in which it falls to insure that it has the same road name number. The field captured road name number for each site must be the same as the road name number of the access zone that surrounds it. Each discrepancy is resolved on a site-by-site manner. Long driveways, sites close to an intersection, or sites served from multiple driveways may be valid reasons to modify the attribute or topology. Once this house-by-house adjustment is made, the RAZ coverage is ready for update of each zone with the emergency response agency that serves each road segment.

Upon establishing accurate RAZ polygons, there are two methods of populating the RAZ attribute table with the appropriate ESPs that serve each zone. The method depends on the availability of an existing MSAG. For new E-911 deployments, there will not be an existing MSAG. In these instances, each RAZ polygon is selected singly or as part of a group of polygons that have the same ESP(s). Each polygon is attributed with a code for the PSAP handling the call in that area, three (3) additional codes for the law, fire and EMS agencies providing emergency services and a final code for the community within which the zone falls. Areas with the same unique combination of these values establish an emergency service zone (ESZ). Each unique occurrence is assigned a single emergency service number in an associated tabular data file.

Editing the attributes of a RAZ polygon will create new combinations of code values. If the combination already exists, the existing ESN is used to attribute the polygons. If the combination is new, a new ESN is established. Updating the sites allows automated update of the MSAG for that road. By transferring the ESN from the RAZs to the site or road C/L layers, the MSAG is developed directly from the attributed site or road data.

As described in a subsequent section, if an MSAG already exists, it can be used to automatically populate the RAZ polygons with the corresponding ESN of each road segment.

Development of Accurate USPS ZIP Code Zones

A ZIP code data layer is created by attributing each RAZ with the USPS ZIP code of the post office that delivers or would deliver mail to that road segment. This data layer provides the necessary spatial overlay to populate each site location with its delivery ZIP code. Review of road names in each ZIP area identifies duplicate road names in different towns that may be in the same ZIP area. There must be only one road in each ZIP or township with a specific name. This procedure identifies, for removal or re-naming, any duplicates.

Development and Maintenance of Geo-coding

Geo-coding allows for automated routing of services to any address in the system. Geo-coding creates a GIS address coverage by attributing each arc (representing street segments from intersection to intersection) with the high and low address range on each side of the street. The high and low existing address on each side of each road is flawlessly determined from the RAZ that overlay each addressed site. By capturing the high and low address in each RAZ, these values may be automatically passed as an attribute to the road C/L coverage. The initial phase of addressing begins with street names and continues as addresses are captured or developed culminating in a completely geo-coded GIS road data layer.

Maintenance of geo-coding is vastly simplified, since the address information is maintained in discretely addressed points and, using the RAZ polygons, is automatically updated into the road C/L data layer. Each time a site is added, deleted or moved, the RAZ polygon(s) affected by the update are automatically checked to insure that the address ranges of the associated road C/L arc have not changed. As described in this invention, the site is linked through its location within a particular RAZ polygon that is attributed with the ARCID of the road section to which it describes the access area. This link provides an automated data path to update any of these layers automatically and accurately from any of the other layers.

Creating a GIS Coverage for Emergency Service Zones

The emergency service zone coverage (ESZ) defines the geographic area of service for each unique combination of law, fire, and EMS emergency service agencies. Each ESZ is assigned a unique emergency service number (ESN) that defines this unique group of agencies. The ESN is included with each record in the MSAG to ascertain the providers for calls received from addresses within that range. The number later determines the agencies that will be listed at the PSAP. It is critical that the ESZ data layer be flawlessly developed. As previously described, the RAZ method of the present invention is used to ensure that each site is within the proper RAZ. As emergency services are provided from roads, the RAZs need only be attributed with the law, fire and EMS agency that provides service to each road segment to create a completely reliable source for transferring the ESN to each site within each RAZ polygon. The GIS development of site-specific RAZs, from the earliest phases of addressing and GPS data capture, assists in the flawless development of RAZ polygons. GIS provides the tools to transfer this data to each site and road for flawless generation of the ESZ data layer. As indicated earlier, each RAZ is attributed with a coded number representing the law provider, another for the fire provider, and another for the EMS agency responding to that segment of road. In a minimal number of cases, a RAZ may require additional splitting to maintain only one provider for each service in each RAZ. Assignment of a unique number to each unique combination of these codes and the PSAP code flawlessly establishes the ESN for each ESZ in each RAZ. In the case where two providers split a single RAZ, the RAZ must be manually split to accommodate the precise response area for each provider.

The RAZs of the present invention provide a completely automated data set for creating the ESZ data layer. The ESZ data layer is a summarized version of the RAZs where all RAZ boundaries have been removed between polygon zones with the same ESN. This data layer provides the database for spatially determining the ESN of any coordinate that falls within the coverage area of the ESZ data layer. This provides a spatial method of selectively routing emergency 9-1-1 calls to the proper PSAP, as described below.

The ESZ data layer is further maintained directly from the RAZ data layer by simply re-attributing and/or splitting polygons. Simple GIS overlay and dissolve techniques can be used to create a new ESZ data layer. The traditional MSAG used for selective routing is created directly from the resulting ESZ data layer by overlaying it onto the site data and passing the updated ESN to the site attributes. Sorting on road name, ESN and address can then directly produce the MSAG.

Figure 12:
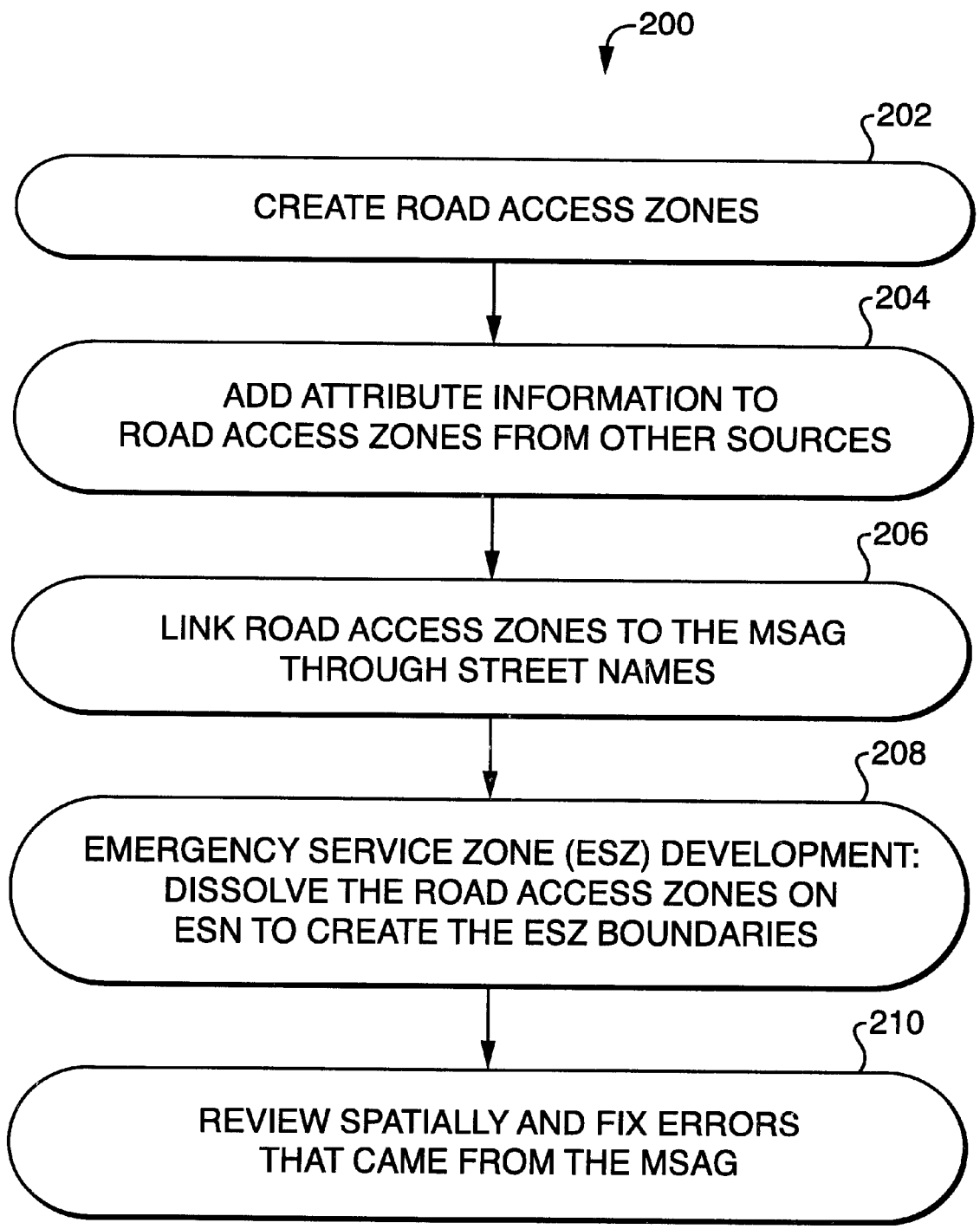
FIG. 12 is a flow diagram of the steps of creating the emergency service zone (ESZ) coverage from RAZs.
Figure 13:
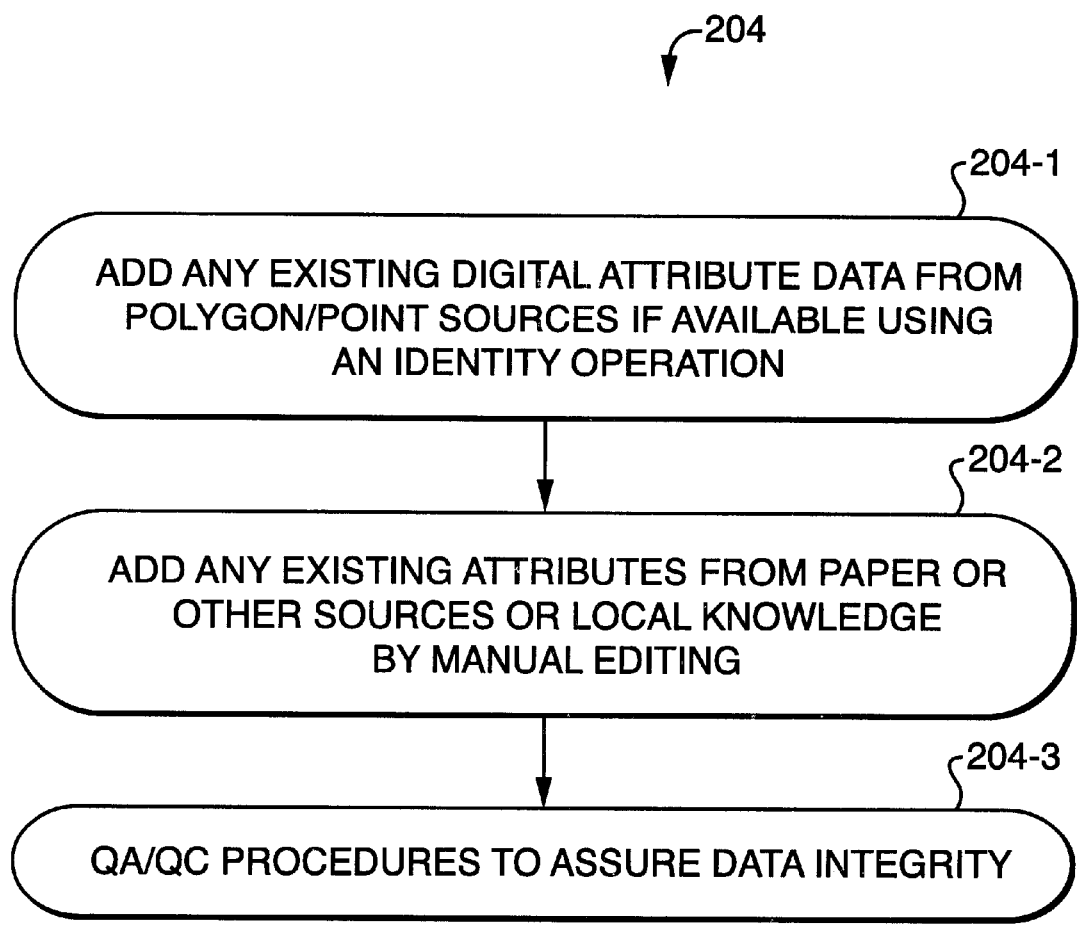
FIG. 13 is a flow diagram of the steps associated with step 204 of the flow diagram of FIG. 12.

Accordingly, with reference now to FIG. 12 and flow diagram 200, a method of creating the ESZ coverage from RAZs and an MSAG is now described. In the first step 202, flow diagram 100 is used to create RAZs, as described previously. In the next step 204, attribute information is added to the RAZs from previously named road name and address sources. In particular, with reference to FIG. 13, step 204 comprises steps 204-1 to 204-3, as follows. First, in step 204-1, any existing digital attribute data from polygon or point sources, if available, are added using an identity operation. An identity passes attribute information from features in one coverage to overlaying features in another coverage. Then, in step 204-2, additional existing attributes from paper or other sources, such as local knowledge, are added to the ESZ by manual editing. Then, in step 204-3, quality control and quality assurance procedures are followed to ensure and maintain data integrity. Quality control procedures include checking that address ranges are continuous and include entries for all named roads.

Figure 14:
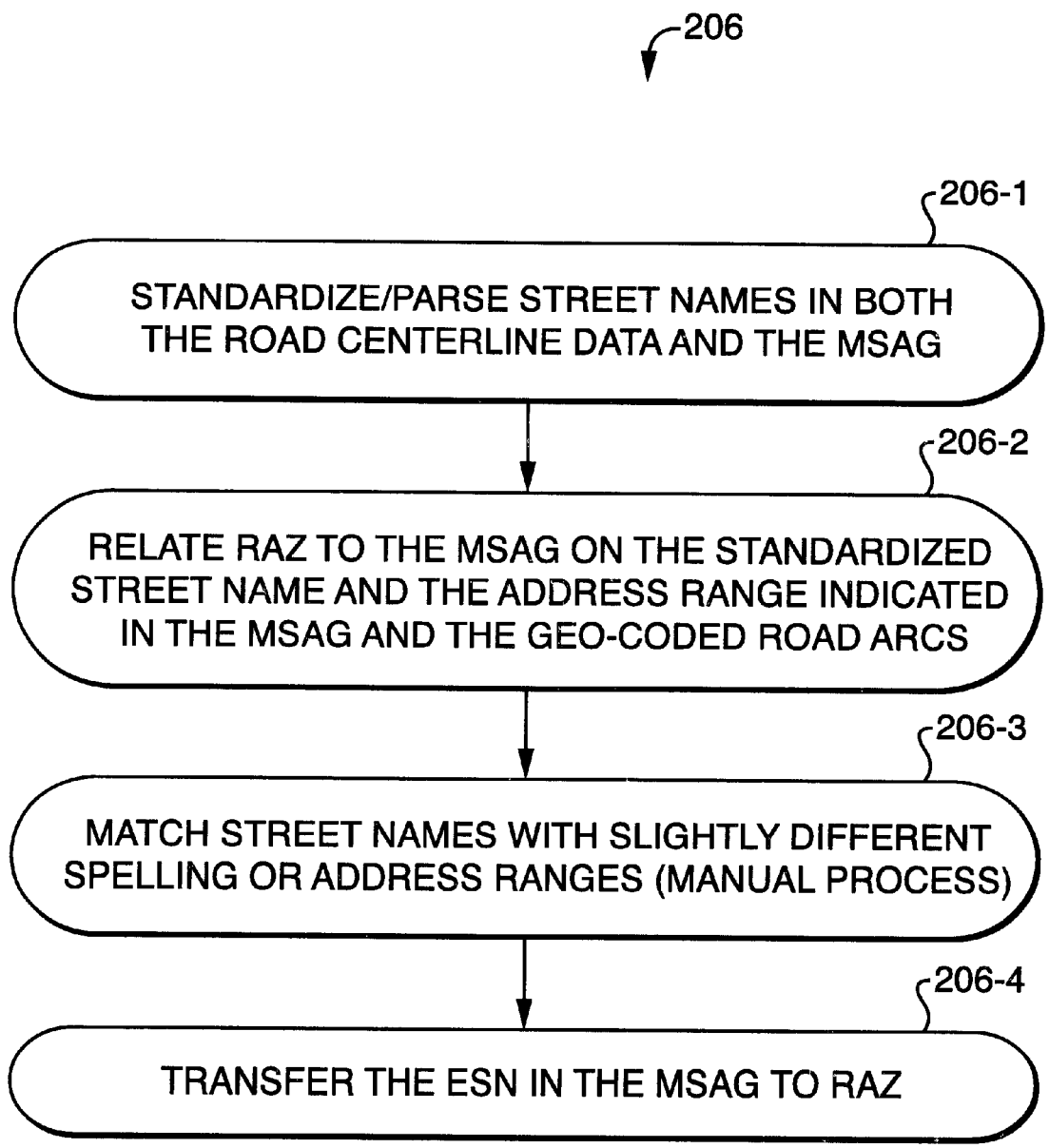
FIG. 14 is a flow diagram of the steps associated with step 206 of the flow diagram of FIG. 12.

With reference again to FIG. 12, in the next step 206 for creating the ESZ, the RAZs are linked to the MSAG through the road names. In particular, with reference to FIG. 14, step 206 comprises steps 206-1 to 206-4. First, in step 206-1, the road names in both the road C/L data and the MSAG are standardized and parsed. Next, in step 206-2, the RAZs are related to the MSAG based on the standardized road name and the address values. Then, in step 206-3, the road names with slightly different spelling or addresses are matched manually. Then, in step 206-4, the ESN in the MSAG is transferred to the RAZs based on this link.

Figure 15:
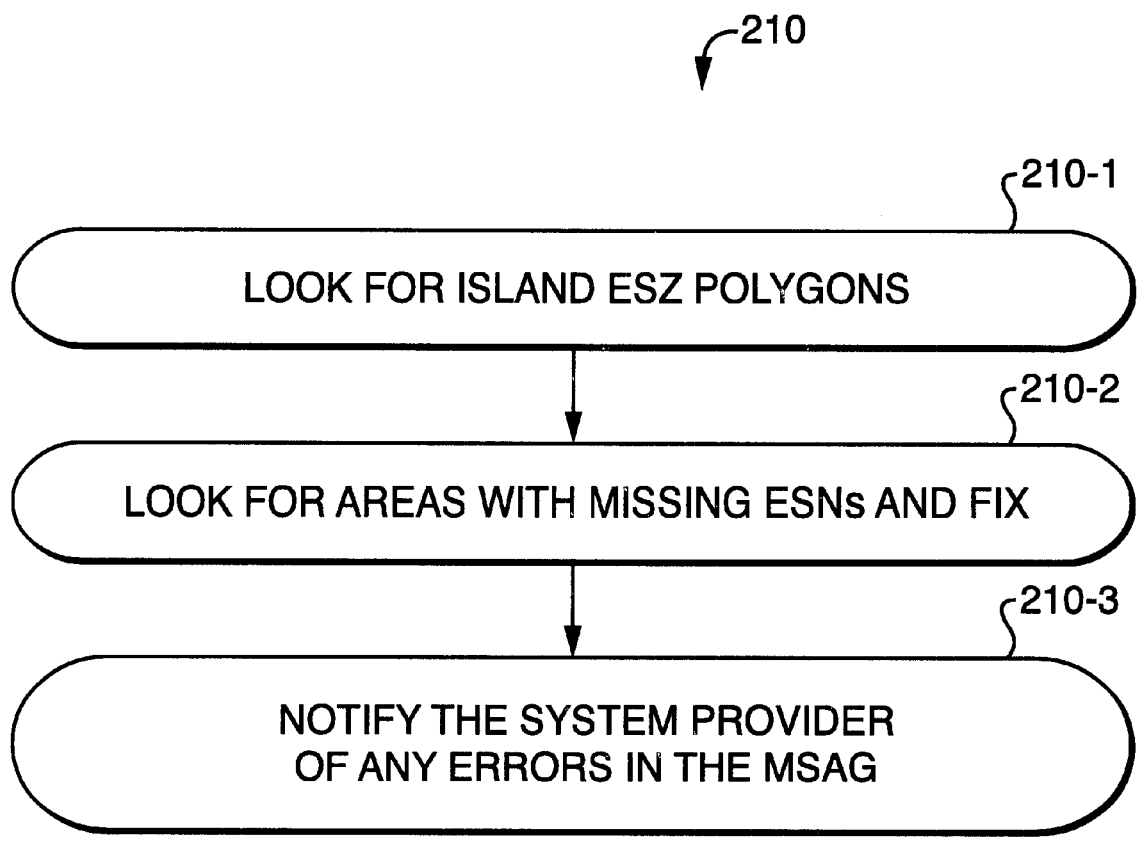
FIG. 15 is a flow diagram of the steps associated with step 210 of the flow diagram of FIG. 12.

With reference again to FIG. 12, in the next step 208 the ESZ is developed by dissolving the RAZs by ESN to crease the ESZ boundaries. This involves dissolving adjacent polygons having the same value for ESN, thereby creating one polygon region for each ESZ. This provides for much more rapid processing during E911 System operation. Finally, in the last step 210, errors due to the MSAG are fixed. With reference to FIG. 15, step 210 comprises steps 210-1 to 210-3. First, in step 210-1, island ESZ polygons (i.e., small polygons containing values for ESN that do not have the same ESN value as the surrounding polygons) are identified and updated with the proper value. Then, in step 210-2, areas with missing ESNs are located and fixed updated with the ESN value of the surrounding polygons. If the surrounding polygons do not have the same ESN value it is necessary to contact a responsible source to assure the road is properly attributed. Then, in step 210-3, the system provider is notified of any errors in the MSAG. These errors include the proper ESN for the island areas and improperly named roads.

Routing of 9-1-1 Calls Using the ESZ-based E-911 System Operation

The ESZ polygon coverage provides quick determination of any coordinate that falls within each polygon of the coverage area. Wireless or land based calls with an x-y coordinate are processed using this summary data layer to determine the TN of the appropriate PSAP and thereby provide automated selective routing based on x-y coordinates and not the address.

Thus, the enhanced 9-1-1 (E-911) system has evolved from the Basic 9-1-1 to E-911, as previously described. The ESZ data layer can be used as a way of providing an automated system for selectively routing 9-1-1 calls originating from telephone equipment at mobile address locations to the proper PSAP and subsequently provide the required information for selective transfer to the proper response agency.

Figure 16:
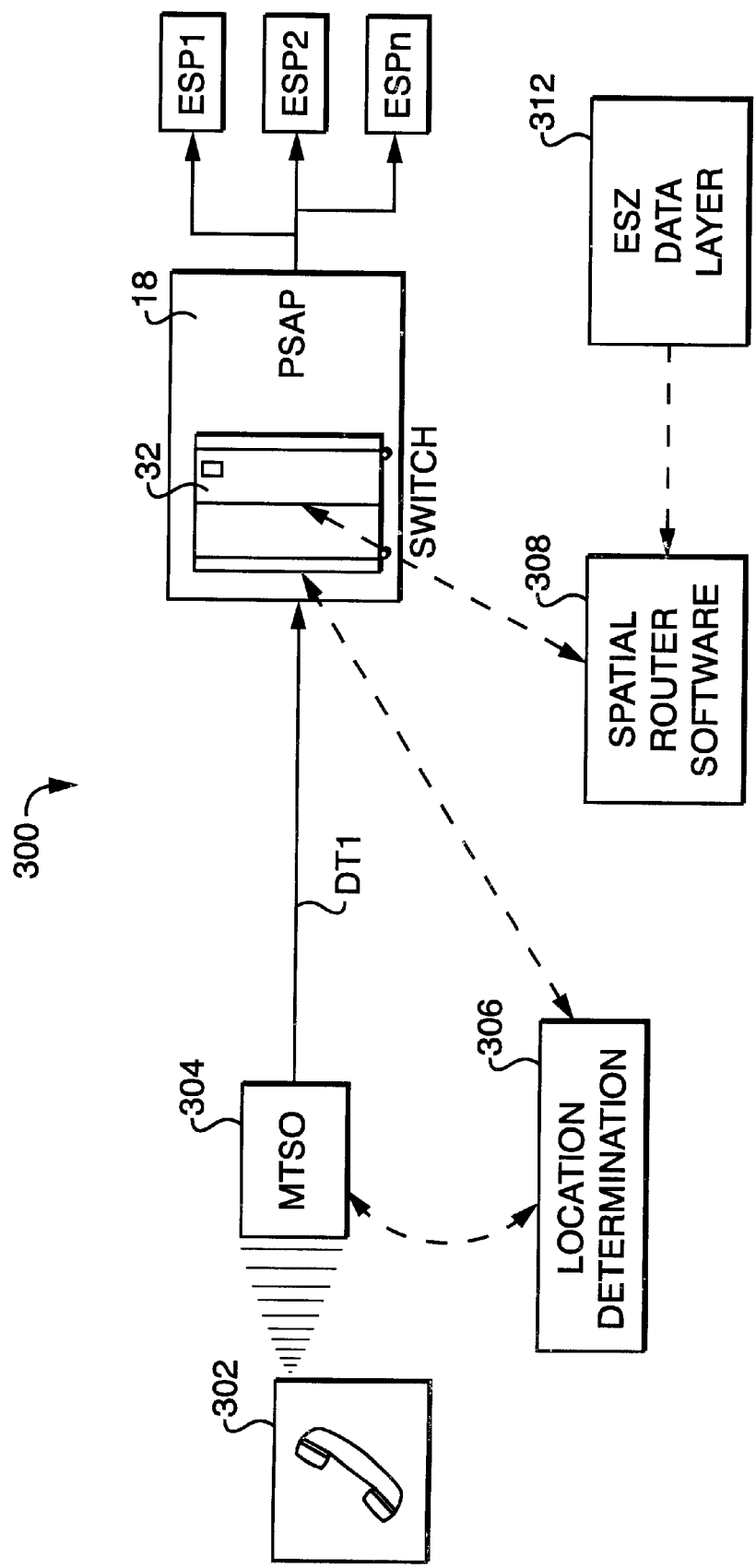
FIG. 16 is a schematic diagram of an E911 system using the ESZ of the present invention.

With reference now to FIG. 16, E-911 system 300 of the present invention comprises a mobile wireless telephone device 302, and mobile telephone switching office (MTSO) 304 in radio wave telecommunication with telephone 302. The latter has an associated telephone number TN, and a calling party number CPN.

There are various technologies currently being developed that allow a wireless carrier to determine the location (x-y coordinate) of a mobile telephone. One system utilizes a triangulation process to determine an approximate location of the caller through an analysis of signal strength measurements and/or propagation delay times of the cellular communications. Another system utilizes the existing Global Positioning System (GPS) with a GPS receiver attached to the cellular telephone to obtain geo-coordinates for the mobile subscriber. It is necessary for the mobile carrier to provide this information to PSAP 18 to properly transfer the emergency call to the correct agency. As shown in the FIG. 16, this location may be passed to the MTSO from a location determination unit 306 in electronic communication with the MTSO for immediate packaging of the coordinate with the CPN information, or may be sent directly to PSAP for immediate use. Generally, GPS-provided coordinates come with the 9-1-1 call. Triangulation methods are routed separately, as they do not originate at MTSO 304.

In many 9-1-1 jurisdictions, there is a single PSAP responsible for wireless calls. Thus, unlike the landline E 9-1-1 described in system 30 where a selective router is required to route a call to the proper PSAP, wireless E 9-1-1 does not require this telephone switch. All 9-1-1 calls may use a direct trunk DT1 to send an electronic signal from MTSO 304 to PSAP 18. No switching is required. All calls are handled and selectively routed at the central PSAP either directly to the response agency or to another PSAP responsible for the jurisdictions in that area.

System 300 further includes a router switch/automatic call distributor 32 (hereinafter, "router switch") in electronic communication with PSAP 18 to distribute wireless 9-1-1 calls to the next available call-taker at the PSAP. Router switch 32 includes router software 308 which allows the router switch to selectively transfer the call to the proper emergency response agency. Router switch 32 and router software 308 are typically enclosed in the same piece of hardware.

Figure 2:
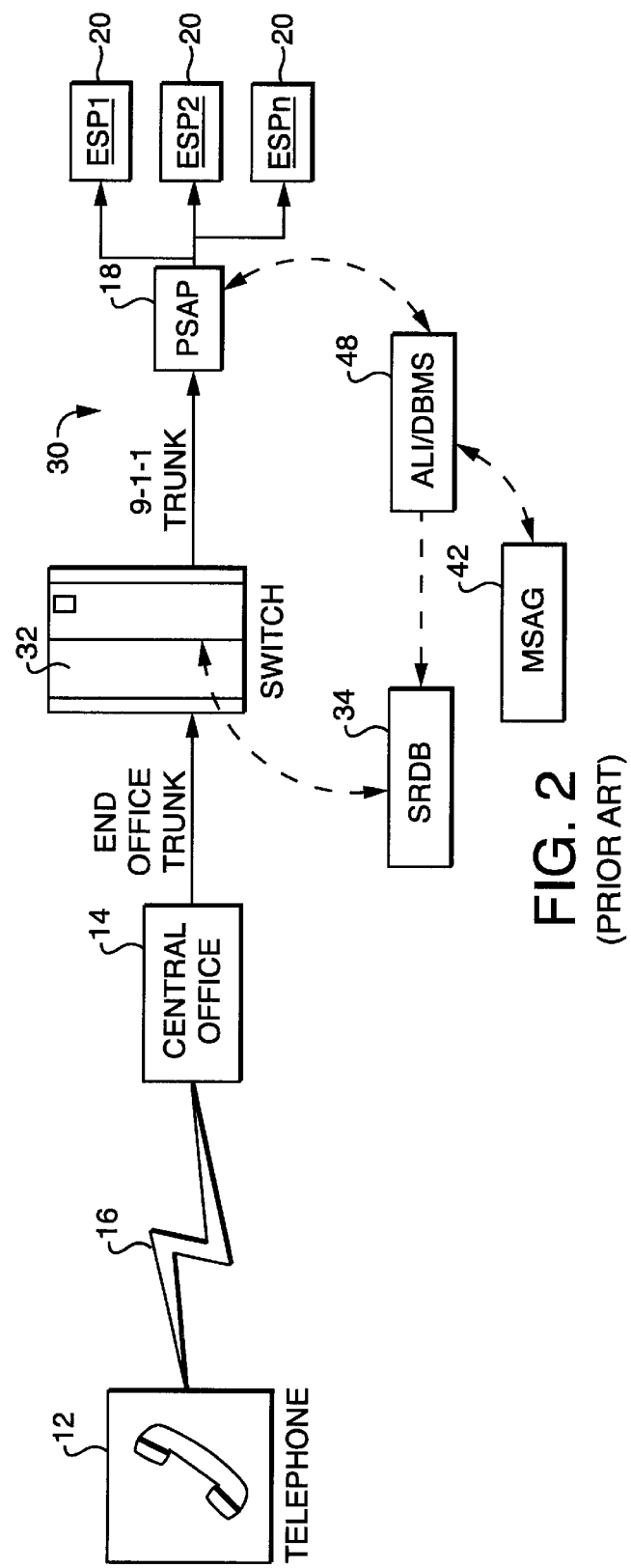
FIG. 2 is a schematic diagram of a prior art E-911 system.

With continuing reference to FIG. 16, system 300 further includes an ESZ data layer 312 in electronic communication with router switch 32. Router software 308 allows router switch 32 to query ESZ 312. The latter is updated as required with specialized software for that purpose. The software that performs update of the ESZ uses the road access zones to maintain the ESZ. As houses/sites are built or demolished, the GIS procedure of adding or removing sites, or re-attributing, or re-shaping a road access zone will automatically update the ESZ data layer. The maintenance software will also cross-reference each address with the existing ALI-database as well as every change to the ALI-database. Addresses that are not found in the GIS site and/or road centerline data are flagged for review and possible update. The maintenance program allow automated update of sites, roads including geo-coding, road names, emergency service agencies, driveways, and ESZ boundaries. The ESZ data layer 312 is used in several methods in this application, depending on the type of coordinate data provided. If high accuracy coordinate is received, router software 308 will query ESZ 312 and return information as to one or more emergency service providers associated with the mobile telephone's location, in a manner similar to landline E-911 system 30 of FIG. 2. The call-taker may continue to use all other map functions provided in a display (not shown) within PSAP 18. For phase I of the FCC order regarding wireless telephony, the accepted standard is to assign a pseudo automatic number identifier (P-ANI) to each sector of each cell tower. This number will be passed, along with the subscriber's mobile telephone number to the PSAP. If only a phase I P-ANI is received, router software 308 will display the coverage area for that cell-sector on the map and provide the ESN with the highest coverage area. The call-taker may then obtain further information from the caller to ascertain a more precise area. Router software 308 will automatically place a higher priority on locations within the coverage area. If a wireless call is received with no coordinate data, the software will display all towers for the cellular carrier providing the call. Many carriers have selected areas within the region. This may assist the call-taker in determining the location of the call.

Once a location is determined, the call-taker will enter the location on the call-taker's screen by pointing a computer mouse cursor on the location. This will automatically query the ESZ and provide the transfer TNs for the law, fire, EMS and other ESPs at that location. In a manner similar to landline E911 systems, the call will then be transferred to the proper provider. In the case where a call is received from a mobile caller outside of the region the call may be selectively transferred to the neighboring jurisdiction.

Data Layer Structure for RAZ, ESZ, and Road C/L

Figure 17:
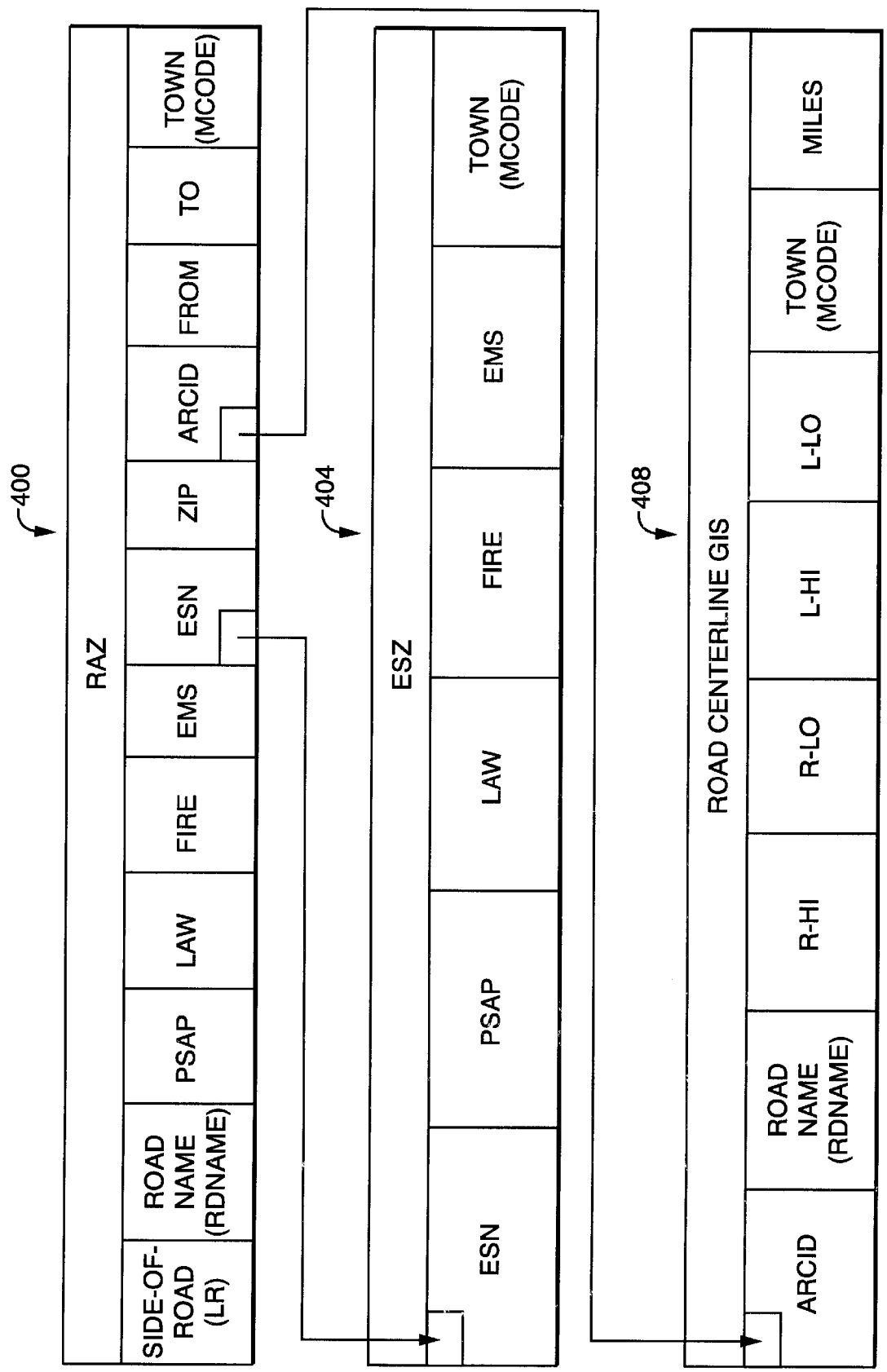
FIG. 17 is a schematic diagram of a data structure (data layer) for a RAZ, an ESZ and road centerline GIS.

The RAZ, ESZ and the road C/L data layers of the present invention have a data structure, as illustrated in FIG. 17. The RAZ data layer structure 400 is stored in a memory 64 and comprises an ESN and a code for each of at least one of the following: side of road, road name, PSAP, law enforcement agency, fire department, EMS, ESN, ZIP code, ARCID, and town, and also includes a low address value and a high address value.

The ESZ data layer structure 404 is stored in a memory unit and comprises an ESN and a code for each of at least one of the following: PSAP, law enforcement agency, fire department, EMS, and town.

The road C/L data layer structure 408 is stored in a memory unit and comprises values corresponding to a length of a road section, a highest address on the right of the road section, a lowest address on the right of the road section, a highest address on the left of the road section, a lowest address on the left of the road section, and a code for each of at least one of the following: ARCID, road name, and town.

While the present invention has been described in connection with examples and preferred embodiments, it will be appreciated that it is not so limited. On the contrary, it is intended to cover all alternatives, modifications, and equivalents as may be included within the spirit and scope of the invention as defined in the appended claims.

What is claimed is:

1. A method of creating an ESZ data layer having emergency service numbers, from an MSAG using road access zones each having associated attributes including a road name, a road center line and an emergency service number, comprising the steps of:
   a) linking the road access zones to the MSAG through the road names; and
   b) creating a plurality of emergency service zones by combining the road access zones that have the same emergency service number.

2. A method according to claim 1, wherein said step a) includes the step of electronically adding to the ESZ data layer one or more existing digital attributes from one or more of said road access zones using an identity operation.

3. A method according to claim 1, wherein said step a) includes the step of manually adding to the ESZ data layer one or more existing attributes.

4. A method according to claim 3, further including the step, after said step b), of correcting errors in the ESZ data layer arising from errors in the MSAG.

5. A system for creating an ESZ data layer, the system comprising:
   a) a computer; and
   b) a software program executable by said computer for implementing the steps of claim 1.

6. A method of creating an ESZ data layer having emergency service numbers, from an MSAG having a first set of road names, comprising the steps of:
   a) creating road access zones, each of said road access zones having attribute information including an associated emergency service number and a second set of road names;
   b) linking said road access zones to the MSAG through said first and second sets of road names; and
   c) creating a plurality of emergency service zones by combining said road access zones that have the same emergency service number.

7. A method according to claim 6, wherein said step b) further includes the step of matching road names having slightly different spelling.

8. A method according to claim 6, wherein said step a) further includes the step of adding attribute information to said road access zones.

9. A method according to claim 8, wherein said attribute information includes at least one of road name, side-of-road, PSAP, community, law, fire, EMS, U.S. Postal Service ZIP code, telephone exchange NNX, high and low address sites or road C/L ARCID.

10. A method according to claim 6, further including the step, after said step c), of identifying any of said emergency access zones missing emergency service numbers.

11. A system for creating an ESZ data layer, the system comprising:
    a) a computer; and
    b) a software program executable by said computer for implementing the steps of claim 6.

12. A system for creating an emergency service zone data layer having emergency service numbers, from an MSAG using road access zones each having an associated road name, a road center line and an emergency service number, comprising:
    a) linking means for linking the road access zones to the MSAG through the road names; and
    b) means for creating a plurality of emergency service zones by combining the road access zones that have the same emergency service number.

13. A system for creating an emergency service zone coverage having emergency service numbers, from a master street address guide having a first set of road names, comprising:
    a) means for creating road access zones, each of said road access zones having an associated emergency service number and a second set of road names;
    b) means for linking said road access zones to the master street address guide through said first and second sets of road names; and c) means for creating a plurality of emergency service zones by combining said road access zones that have the same emergency service number.

14. A computer readable medium having computer-executable instructions for creating an emergency service zone data layer having emergency service numbers, from an MSAG using road access zones each having an associated road name, a road center line and an emergency service number, which when executed by the computer comprises:

a) linking the road access zones to the MSAG through the road names; and b) creating a plurality of emergency service zones by combining the road access zones that have the same emergency service number.

15. A computer readable medium for creating an emergency service zone coverage having emergency service numbers, from a master street address guide having a first set of road names, which when executed by the computer comprises:

a) creating road access zones, each of said road access zones having an associated emergency service number and a second set of road names;

b) linking said road access zones to the master street address guide through said first and second sets of road names; and c) creating a plurality of emergency service zones by combining said road access zones that have the same emergency service number.

* * * * *